US012776183B2

(12) United States Patent
Nelson et al.

(10) Patent No.: US 12,776,183 B2
(45) **Date of Patent: *Oct. 27, 2026**

(54) SHEET MUSIC EMPLOYED FOR SYMBOL GENERATION AND DISPLAY IN GAMING ENVIRONMENTS

(71) Applicant: IGT, Las Vegas, NV (US)

(72) Inventors: Dwayne Nelson, Las Vegas, NV (US); Jeffery McIntosh, Dieppe (CA)

(73) Assignee: IGT, Las Vegas, NV (US)

( * ) Notice: Subject to any disclaimer, the term of this patent is extended or adjusted under 35 U.S.C. 154(b) by 315 days.

This patent is subject to a terminal disclaimer.

(21) Appl. No.: 18/451,550

(22) Filed: Aug. 17, 2023

(65) Prior Publication Data

US 2025/0061764 A1 Feb. 20, 2025

(51) Int. Cl.
*G07F 17/34* (2006.01)
*G07F 17/32* (2006.01)

(52) U.S. Cl.
CPC ...... *G07F 17/3213* (2013.01); *G07F 17/3267* (2013.01)

(58) Field of Classification Search
CPC .......................... G07F 17/3213; G07F 17/3267
See application file for complete search history.

(56) References Cited

U.S. PATENT DOCUMENTS 5,695,188 A 12/1997 Ishibashi
6,729,618 B1 5/2004 Koenig et al.
6,848,996 B2 2/2005 Hecht et al.
7,261,295 B2 8/2007 Grant
7,355,112 B2 4/2008 Laakso
7,789,748 B2 9/2010 Landrum et al.
7,867,085 B2 1/2011 Pryzby et al.
8,025,562 B2 9/2011 Walker et al.
8,138,409 B2 3/2012 Brennan
8,353,758 B2 1/2013 Stelzer et al.
8,371,923 B1 * 2/2013 Iremonger .............. G07F 17/32 463/19
8,371,940 B1 2/2013 Robinson et al.
8,469,820 B2 6/2013 Nathan et al.
8,491,392 B2 7/2013 Baerlocher
8,545,320 B2 10/2013 Bonney et al.
8,591,308 B2 11/2013 Hoffman et al.
8,651,938 B2 2/2014 Iremonger et al.
8,821,283 B2 9/2014 Dicillo et al.
8,986,111 B2 3/2015 Cuddy et al.
9,026,942 B2 5/2015 Juristovski et al.
9,033,799 B2 5/2015 Decker et al.
9,117,333 B2 8/2015 Nakamura
9,330,540 B2 5/2016 Michels
9,409,092 B2 8/2016 Howson
9,573,049 B2 2/2017 Rubin et al.
9,799,314 B2 10/2017 Lopiccolo et al.
10,909,817 B2 2/2021 Watkins
11,017,635 B2 5/2021 Furlong
11,107,319 B2 8/2021 Santisi
11,257,332 B2 2/2022 Fong
11,562,615 B2 1/2023 Adamek et al.
(Continued)

*Primary Examiner* — Xuan M Thai
*Assistant Examiner* — Shauna-Kay Hall
(74) *Attorney, Agent, or Firm* — Neal, Gerber & Eisenberg LLP

(57) ABSTRACT

Gaming systems and methods that provide sheet music employed for symbol generation and display in gaming environments.

15 Claims, 23 Drawing Sheets

(56) References Cited

U.S. PATENT DOCUMENTS

| | | | |
|---|---|---|---|
| 11,986,731 B2 | 5/2024 | Walker et al. | |
| 2001/0009868 A1 | 7/2001 | Sakaguchi et al. | |
| 2005/0054441 A1 | 3/2005 | Landrum et al. | |
| 2005/0059470 A1 | 3/2005 | Cannon | |
| 2006/0025206 A1 | 2/2006 | Walker et al. | |
| 2006/0040721 A1 | 2/2006 | Cuddy et al. | |
| 2006/0097449 A1* | 5/2006 | Gagnon | A63F 3/00119 273/242 |
| 2007/0173309 A1 | 7/2007 | Rigsby | |
| 2007/0243928 A1 | 10/2007 | Iddings | |
| 2008/0020845 A1 | 1/2008 | Low et al. | |
| 2008/0076575 A1 | 3/2008 | Bailey | |
| 2008/0102923 A1 | 5/2008 | Esses et al. | |
| 2008/0102958 A1 | 5/2008 | Kitamura et al. | |
| 2008/0108401 A1 | 5/2008 | Baerlocher et al. | |
| 2008/0113784 A1 | 5/2008 | Vallejo et al. | |
| 2008/0113811 A1 | 5/2008 | Linard et al. | |
| 2008/0176655 A1 | 7/2008 | James et al. | |
| 2008/0234049 A1 | 9/2008 | Leblanc et al. | |
| 2009/0186692 A1 | 7/2009 | Thomas et al. | |
| 2009/0312086 A1* | 12/2009 | Kanellos | G07F 17/3286 463/20 |
| 2009/0314154 A1 | 12/2009 | Esaki et al. | |
| 2010/0029381 A1 | 2/2010 | Vancura | |
| 2010/0029831 A1* | 2/2010 | Meada | C08K 5/16 524/544 |
| 2010/0069138 A1 | 3/2010 | Acres | |
| 2010/0184497 A1 | 7/2010 | Cichowlas | |
| 2010/0273555 A1 | 10/2010 | Beerhorst | |
| 2011/0118011 A1 | 5/2011 | Filipour et al. | |
| 2013/0005470 A1 | 1/2013 | Evans et al. | |
| 2013/0095905 A1 | 4/2013 | Aoki et al. | |
| 2013/0157759 A1* | 6/2013 | Iremonger | G07F 17/3258 463/30 |
| 2013/0203492 A1 | 8/2013 | Yum | |
| 2014/0080606 A1 | 3/2014 | Gillet et al. | |
| 2014/0364203 A1 | 12/2014 | Nelson et al. | |
| 2014/0370975 A1 | 12/2014 | Coronel et al. | |
| 2016/0343362 A1 | 11/2016 | Brosius et al. | |
| 2017/0025034 A1 | 1/2017 | Chapman | |
| 2017/0319954 A1 | 11/2017 | Goslin | |
| 2018/0053379 A1 | 2/2018 | Meyer | |
| 2019/0102998 A1 | 4/2019 | Hirai et al. | |
| 2019/0340886 A1* | 11/2019 | Humphrey | G07F 17/3293 |
| 2020/0234545 A1 | 7/2020 | Fong | |
| 2024/0362968 A1 | 10/2024 | Lyons et al. | |
| 2025/0061764 A1 | 2/2025 | Nelson et al. | |
| 2025/0061765 A1 | 2/2025 | Nelson et al. | |
| 2025/0061766 A1 | 2/2025 | Nelson et al. | |
| 2025/0061767 A1 | 2/2025 | Nelson et al. | |

* cited by examiner

Guitar Symbols

| Chord | Slot Symbol |
|---|---|
| F#9sus2 |  |
| C major |  |
| Cmaj13sus |  |
| D Major |  |
| E7sus |  |
| Em |  |
| D Minor |  |

Bass Symbols

| Chord | Slot Symbol |
|---|---|
| F#9sus2 |  |
| C major |  |
| Cmaj13sus |  |
| D Major |  |
| E7sus |  |
| Em |  |
| D Minor |  |

Drum Symbols

| Chord | Slot Symbol |
|---|---|
| F#9sus2 |  |
| C major |  |
| Cmaj13sus |  |
| D Major |  |
| E7sus |  |
| Em |  |
| D Minor |  |

Voice Symbols

| Note | Slot Symbol |
|---|---|
| A |  |
| B |  |
| C |  |
| D |  |
| E |  |
| F |  |
| G |  |

SHEET MUSIC EMPLOYED FOR SYMBOL GENERATION AND DISPLAY IN GAMING ENVIRONMENTS

CROSS-REFERENCE TO RELATED APPLICATIONS

This application is related to the following commonly owned co-pending patent applications: U.S. application Ser. No. 18/451,527, entitled "SHEET MUSIC EMPLOYED FOR SYMBOL GENERATION AND DISPLAY AND PLAYER INPUTS IN GAMING ENVIRONMENTS," U.S. application Ser. No. 18/451,567, entitled "SHEET MUSIC EMPLOYED FOR SYMBOL GENERATION AND DISPLAY IN PARTIALLY RANDOM GAMING ENVIRONMENTS," U.S. application Ser. No. 18/451,585, entitled: "MULTIPLE INSTRUMENT SHEET MUSIC EMPLOYED FOR SYMBOL GENERATION AND DISPLAY IN GAMING ENVIRONMENTS," and U.S. application Ser. No. 18/451,612, entitled: "SELECTION OF SHEET MUSIC EMPLOYED FOR SYMBOL GENERATION AND DISPLAY IN GAMING ENVIRONMENTS,".

BACKGROUND

The present disclosure relates to sheet music employed for symbol generation and display in gaming environments.

Gaming machines may require a player to place a wager to activate a play of the primary game. Gaming machines may provide one or more awards in a play of a primary game. Gaming machines may determine such awards based on a winning symbol or a winning symbol combination. Gaming machines may provide a play of a secondary game. Gaming machines may provide one or more awards in a play of a secondary game.

BRIEF SUMMARY

In various embodiments, the present disclosure relates to a gaming system including a processor and a memory device that stores a plurality of instructions that, when executed by the processor, cause the processor to: cause a display, by a display device, of sheet music and a component of the sheet music, cause a display, by the display device, of part of a reel, cause a display, by the display device, of an indication of a mapping of the component of the sheet music onto the reel, and cause a display, by the display device, of an indication of an outcome based on the mapping of the component of the sheet music onto the reel.

In various further embodiments, the present disclosure relates to a gaming system including a processor and a memory device that stores a plurality of instructions that, when executed by the processor, cause the processor to: cause a display, by a display device, of sheet music and vocal components of the sheet music, cause a display, by the display device, of an indication of a mapping of the vocal components of the sheet music onto a reel, and cause a display, by the display device, of an indication of an outcome based on the mapping of the vocal components of the sheet music onto the reel.

In various further embodiments, the present disclosure relates to a gaming system including a processor and a memory device that stores a plurality of instructions that, when executed by the processor, cause the processor to: cause a display, by a display device, of sheet music and a plurality of different components of the sheet music, cause a display, by the display device, of a mapping of the plurality of different components of the sheet music into a single reel symbol on a reel, and cause a display, by the display device, of an indication of an outcome based at least in part on the single reel symbol on the reel.

Additional features and advantages are described in, and will be apparent from, the following Detailed Description and the figures.

DETAILED DESCRIPTION

In various embodiments, the present disclosure relates to gaming systems and methods that employ sheet music for a song to generate and display symbols for one or more plays of one or more games.

In various embodiments, for one or more plays of a game, the gaming system displays the sheet music and symbol displays for the game (such as reels), selects a section of the sheet music (such as randomly or in another manner), uses the selected section of the sheet music to determine notes (from that section), maps the determined notes to symbols to display on the symbol display positions, displays the symbols at the symbol display positions as the outcome for the play of the game, and determines any awards based on those displayed symbols on the symbol displays. In various embodiments, the display of the sheet music and symbol for a play of a game are sequential. In various embodiments, the display of the sheet music and symbol for a play of a game are partially or entirely simultaneous.

Sheet Music Components

To better understand the various different embodiments of the present disclosure, a general description of sheet music for a song and the components thereof are first provided. A song is meant herein to include any song, music, musical composition, or the like.

Sheet music includes different components that provide a musician with the information needed to produce music using an instrument and/or singing. Each page of sheet music is read from left to right and from the top to the bottom.

Figure 1A:
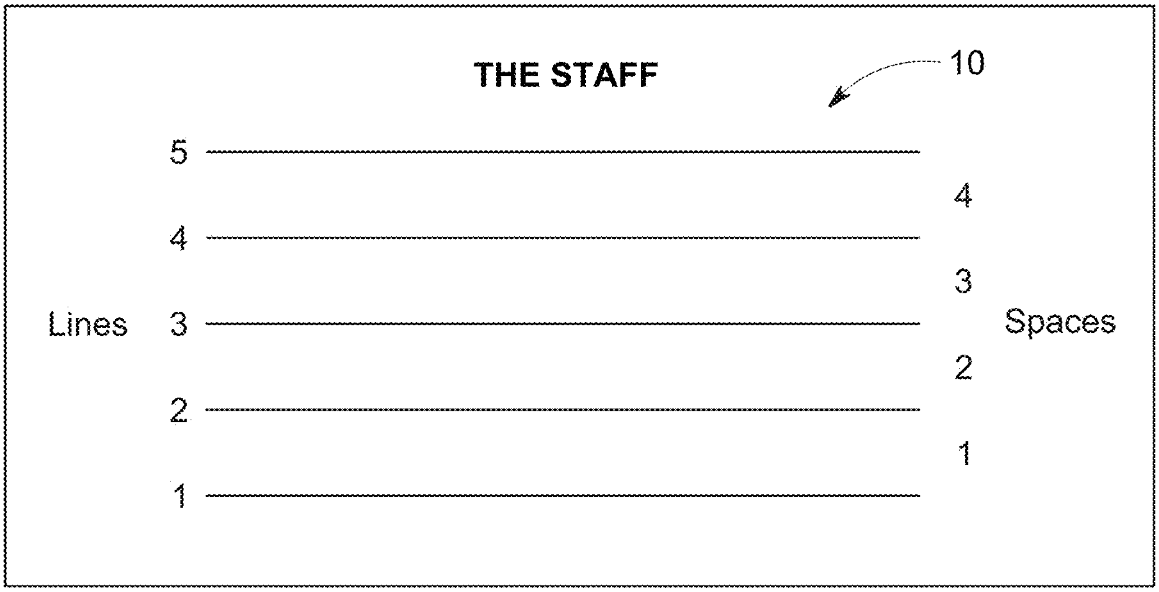
FIG. 1A is a front view of an example staff for sheet music.

Sheet music can include one or more staffs (i.e., staff components). FIG. 1A illustrates an example staff 10 that includes a set of five horizontal lines labeled 1 to 5 and four spaces labeled 1 to 4 respectively between the lines, and that each represent a different musical pitch.

Figure 1B:
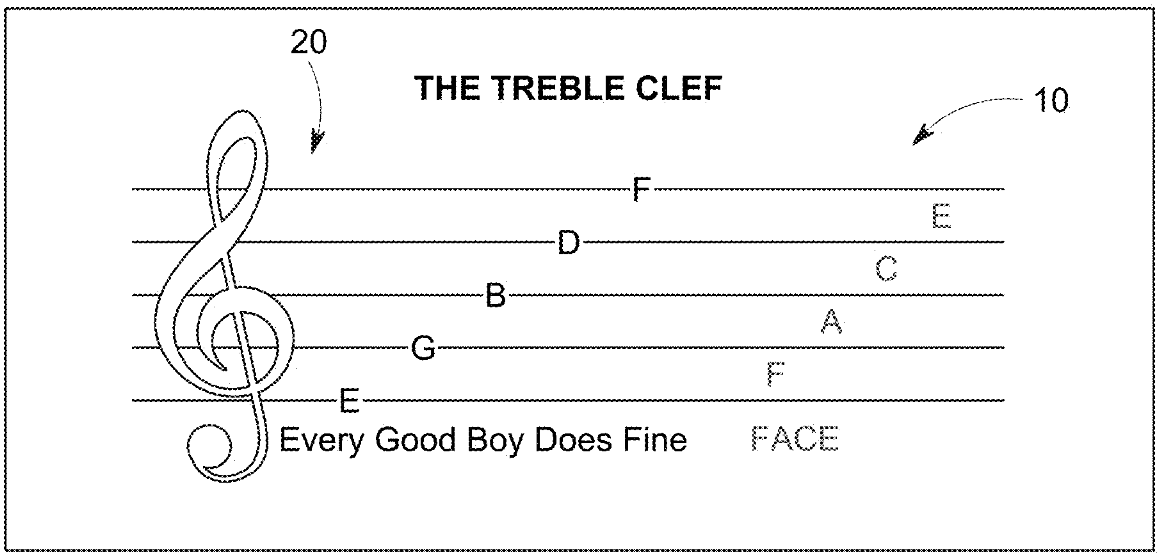
FIG. 1B is a front view of an example treble clef on an example staff for sheet music.

Sheet music can include one or more clefs (i.e., clef components). A clef is a musical symbol that indicates which notes are represented by the lines and spaces on a staff. The clef on a staff assigns a particular pitch to one of the five lines, which also defines the pitches on the remaining lines and spaces of the staff. The most common clefs are the treble clef, the bass clef, the alto clef, and the tenor clef. Treble clefs are used as an example herein, but it should be appreciated that the present disclosure is not limited to treble clefs. FIG. 1B illustrates a treble clef 20 on a staff 10.

Figure 1C:
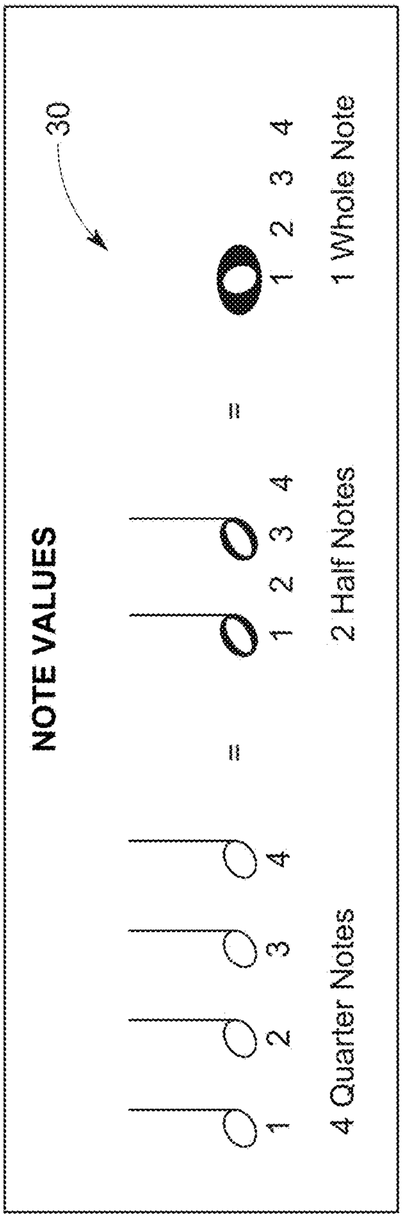
FIG. 1C is a front view of different example notes for sheet music.
Figure 1D:
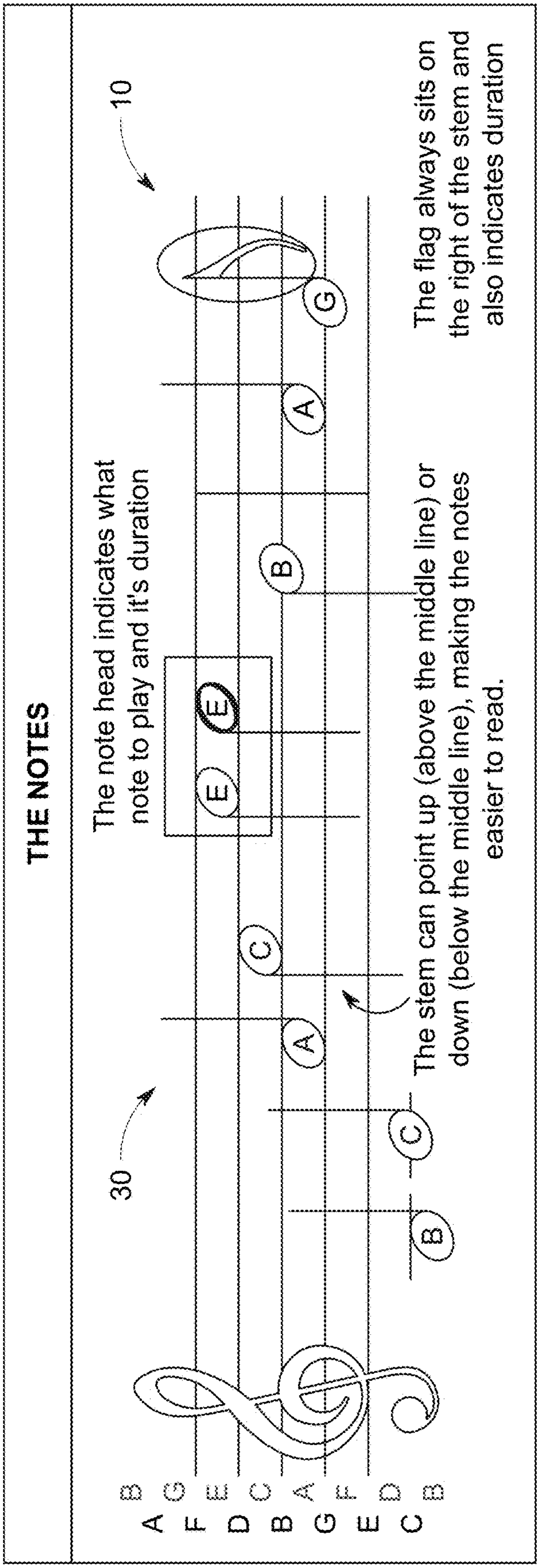
FIG. 1D is a front view of different example notes on an example staff for sheet music.

Sheet music includes notes (i.e., note components) positioned on the staff and particularly on the lines or in between the lines. The location of each note determines the value of the note (for example, a "C" note vs "D" note). FIGS. 1C and 1D illustrate example notes 30 and how example notes 30 can be on a staff 10 (such as how 4 quarter notes, 2 half notes, and 1 whole note can be indicated). For example, if the timing of a song is 4 beats per bar, a bar would have 4 quarter notes, 2 half notes, 2 quarters notes, and one half note or 1 whole note such that the bar is always 4 beats.

Certain sheet music can include components in the form of letters that form words or otherwise indicate vocals for a song. Certain sheet music does not include components in the form of letters that form words or otherwise indicate vocals for a song because no vocals are part of the song or because this version of the song represented by the sheet music does not have the vocals for the song. The sheet music that includes components in the form of letters can have the letters below the staff, on the staff or above the staff.

Figure 1E:
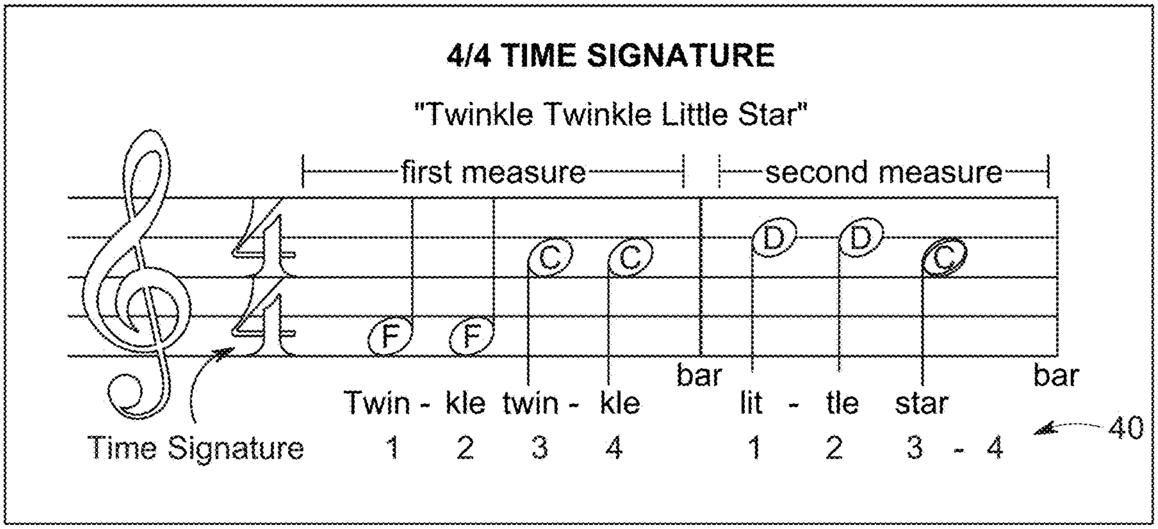
FIG. 1E is a front view of an example time signature for sheet music.

Sheet music can include one or more time signatures (not shown) (i.e., time signature components) for a staff such as 4 beats per bar (such that the music can be broken up into bars). FIG. 1E illustrates a time signature 40 that is 4/4, meaning there are four beats per bar and that every quarter note gets one beat. A time signature that is 4/4 is a common in sheet music.

Sheet music can include one or more tempo indicators (not shown) (i.e., tempo indicator components) for the music such as 90 beats per minute that connotes the speed at which the notes on the staff should be played to produce the music.

Sheet music can include one or more rests (not shown) that are silence in the music), one or more slurs (not shown), one or more mutes (not shown), and one or more other audible features (not shown).

Sheet music can provide the information needed for an instrument to play a single note or multiple notes. When an instrument combines notes, that results in musical chords that can be of many different types (such as major chords, minor chords, inverted chords, etc.).

Sheet music can provide comments needed for an instrument to play a single note or multiple notes. A comment can, for example, include a suggested player finger to use (such as "index finger").

Sheet music can take other forms such as the popular guitar or bass tablatures that shows the notes as finger positions on the guitar.

Sheet music can include various other components such as the example components described below.

Various embodiments employ one or more of these components of sheet music for one or more plays of a game such as in but not limited to the various example embodiments described below.

Using Sheet Music to Generate and Display Symbols for Play of a Game

In various embodiments, the gaming systems employ the sheet music in a play of a primary game (such as primary wagering game). In various embodiments, the primary game is a reel game, a card game such as a poker or blackjack game, a keno game, a bingo game, or other suitable game.

In various embodiments, the gaming systems employ the sheet music in a play of a secondary game (such as a bonus game triggered from a play of a primary game or triggered by the gaming system in another manner). In various embodiments, the secondary game is a reel game, a card game such as a poker or blackjack game, a keno game, a bingo game, or other suitable game. In various such embodiments, the secondary game includes a plurality of free plays of the game.

In various embodiments, the gaming systems display the sheet music in addition to and simultaneously with the display of one or more other components (such as reels) of the play of the game.

In various embodiments, the gaming systems display the sheet music as the main or sole displayed components of the play of the game.

In various embodiments, the gaming systems do not display the sheet music, but rather displays the symbols (resulting from the use of the sheet music) such as on the reels for the play of the game.

In various embodiments, the gaming systems display the sheet music or sections thereof as part of the play of the game that employs the sheet music.

In various embodiments, the display of the sheet music or section thereof is on a same display device as the symbol display(s) (such as the reels) for the play of the game.

In various embodiments, the display of the sheet music or section thereof is adjacent to the display of the symbol display(s) for the play of the game.

In various embodiments, the display of the sheet music or section thereof is in a service window of such display device(s).

In various embodiments, the display of the sheet music or section thereof is remote from the display of the symbol display(s) for the play of the game.

In various embodiments, the display of the sheet music or section thereof is on a separate display device than the display device that displays the symbol display(s) (such as the reels) for the play of the game.

In various embodiments, the display of the sheet music or section thereof is on a separate display device that is above a bank of electronic gaming machines.

In various embodiments, the display of the sheet music or section thereof is on a separate display device that is completely separate from the electronic gaming machines such as on a display device of a player electronic mobile device such as a player cellular telephone.

In various embodiments, the gaming systems employ the displayed sheet music to generate and display all of the symbols for the play of the game that employs the sheet music.

In various embodiments, the gaming systems employ the displayed sheet music to generate and display one or more but not all of the symbols for the play of the game that employs the sheet music. In various such embodiments, the gaming systems and methods can employ one or more other suitable manners for generating one or more other symbols for the play of the game that employs the displayed sheet music. In such embodiments, the gaming system can combine the display of such symbols that are generated in different manners.

In various embodiments, the gaming systems employ the displayed sheet music to generate and display one or more secondary game triggering symbols such as during a play of a primary game that employs the sheet music.

In various embodiments, the gaming systems directly use the notes of the displayed sheet music as the generated and displayed symbols for the play of the game.

In various embodiments, the gaming systems indirectly use the notes of the displayed sheet music to determine the generated and displayed symbols for the play of the game.

In various embodiments, the gaming systems display the correspondence or indications of the correspondence between the notes of the displayed sheet music to the symbols for the play of the game.

In various embodiments, the gaming systems do not display the correspondence or indications between the notes of the displayed sheet music to the symbols for the play of the game.

In various embodiments, the gaming systems employ the displayed sheet music to directly determine monetary awards (such as monetary credits or currency) for the play of the game.

In various embodiments, the gaming systems employ the displayed sheet music to determine non-monetary awards (such as player tracking points or other points or units) for the play of the game.

In various embodiments, the gaming systems employ the displayed sheet music as an added feature for the play of the game but not for determining any awards for the play of the game.

In various embodiments, the gaming systems are or includes electronic gaming machines ("EGMs"), video lottery terminals ("VLTs"), sport wagering terminals, electronic table games ("ETGs"), social gaming systems (such as slot games played for no money), online gaming systems, and/or mobile gaming systems. While EGMs are used as primary examples herein, such examples are not meant to limit the present disclosure.

In various embodiments, the gaming systems display the player's credit balance, the player's wagers, and any awards in amounts of monetary credits or currency; however, such amounts can be for non-monetary credits, promotional credits, and/or player tracking points or credits in accordance with the present disclosure.

Example Sheet Music Mappings

In various embodiments, the gaming system maps the displayed sheet music to a set of one or more symbol displays (such as but not limited to one or more reels, wheels, boards, or cards) to form one or more of the symbol displays including one or more symbols on each of the one or more of the symbol displays. As indicated above, reels are employed herein as the primary example of such symbol displays, but such examples are not meant to limit the present disclosure.

Figure 2A:
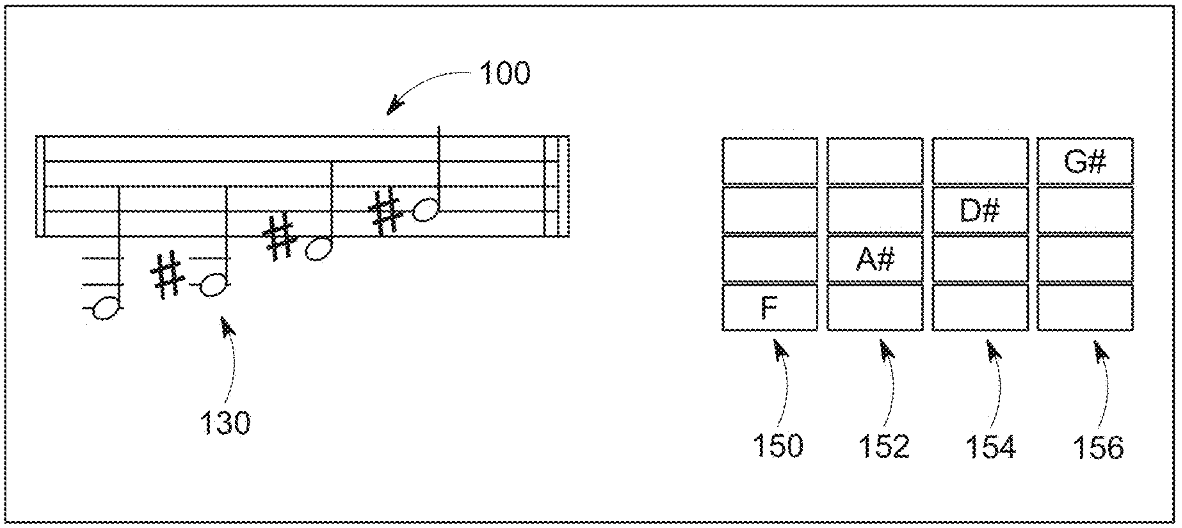
FIG. 2A is a front view of an example section of sheet music and an example mapping of the notes of the sheet music on an example set of four vertical reels in accordance with one example embodiment of the present disclosure.

FIG. 2A illustrates a section of sheet music 100 and a mapping of the notes 130 of that sheet music 100 to a set of four vertical reels 150, 152, 154, and 156. The sheet music 100 includes the notes F, A #, D #and G #(not labeled). These notes are shown mapped to the four horizontal rows of the four reels 150, 152, 154, and 156. This very generally shows that a gaming system can display notes on sheet music and map those displayed notes onto displayed reels for a play of a game in accordance with various embodiments of the present disclosure. In various embodiments, for a play of the game, based on the selection of the section of the sheet music (either by the processor of the gaming system, or by the player, or by a combination of both the processor of the gaming system and the player), the generated symbols for the reels for the play of the game are selected and displayed by the gaming system based on the displayed notes of that section of the sheet music.

In various embodiments, other features of the displayed sheet music can also be employed for a play of the game. For example, in various embodiments, the quantity of symbols on a reel can be based on the quantity of bars in the sheet music times the quantity of beats per bar. In various other embodiments, if the sheet music has notes shorter than the quarter note (such as an eight note), the bar can be broken into 8 reel symbols for a bar in 4 beats per bar for the mapping.

It should be appreciated from these examples that the present disclosure provides numerous different ways to map displayed notes from displayed sheet music to the reels, and that only certain examples of which are discussed herein in more detail. Such examples are not meant to limit the present disclosure.

In various other embodiments, the displayed sheet music is rotated 90 degrees (clockwise or alternatively counterclockwise) to form a different displayed correspondence between the displayed notes on the displayed sheet music and the mapped and displayed symbols one or more reels.

Figure 2B:
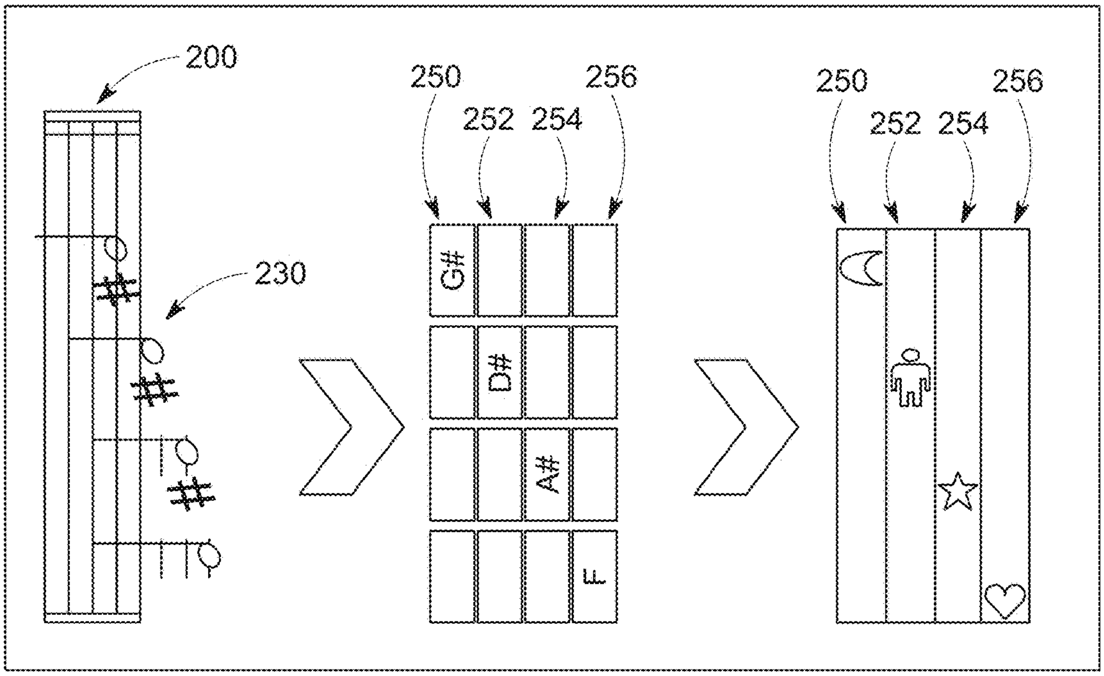
FIG. 2B is a front view of an example section of sheet music and an example mapping of the notes of the sheet music on an example set of four vertical reels in accordance with another example embodiment of the present disclosure.

FIG. 2B illustrates a section of sheet music 200 and an example mapping of the displayed notes 230 of that displayed sheet music 200 onto a displayed set of four vertical reels 250, 252, 254, and 256. FIG. 2B illustrates the section of sheet music 200 is rotated 90 degrees, and thus that the mapping is rotated 90 degrees. FIG. 2B also illustrates that non-musical symbols corresponding to the musical notes can be employed on the reels 250, 252, 254, and 256 based on the mapping from the displayed notes. FIG. 2B illustrates an example mapping of the notes from the sheet music to symbols displayed on the reels 250, 252, 254, and 256. When the notes are determined, the gaming system can automatically map the notes to the reels to generate and display the symbols on the reels for a play of a game. The gaming system can also determine any awards based on the displayed symbols on the reels (and thus indirectly based on the displayed notes on the sheet music), and provide any determined awards to the player for the play of the game.

In this example of FIG. 2B, the note F maps to a heart symbol on the fourth reel 254, the note A #maps to a star symbol on the third reel 254, the note D #maps to a person symbol on the second reel 252, and the note G #maps to a quarter moon symbol on the first reel 250. Thus, the notes are mapped to the symbols, and when the notes are determined from a selected displayed section of the displayed sheet music 200, the gaming system uses the mapping to generate and display these symbols on the reels for the play of the game. In other words, the gaming system uses the notes to determine symbols that are then displayed on the reels in a manner that correspond to the positions of the notes on the section of sheet music. For each play of the game, the gaming system can select one of the different sections of the sheet music, cause the mapping of the notes from that selected section to generate and display the symbols on the reels, and to then determine any awards based on those displayed symbols. In various embodiments, for each play of the game, the gaming system can select the section of the sheet music randomly, in a predetermined manner, and/or based on one or more player inputs for that play of the game.

In various embodiments, the gaming system can employ a suitable paytable (not shown) for the reels based in part on the notes of the sheet music and their respective quantities of occurrences in the various different sections of the sheet music. For example, the paytable can includes a 500 credit payout when the heart symbol lands on a wagered on payline based on the occurrences of the quantity of occurrences of the F note (that maps to the heart symbol) in the sheet music. The gaming system can determine any awards for the play of the reel game based on the displayed mapped symbols on the reels generated from the notes. This simple example shows how notes of a section of sheet music can be used to generate and display symbols on the reels for a play of a reel game including such reels. This generation of the sections, notes, and symbols can thus be predetermined, random, pseudo-random, or player selected, depending on how the section of the sheet music is selected for the play of the game.

As mentioned above, in various other embodiments, the notes can themselves be used as the symbols on the reels (without conversions to other symbols). In various such embodiments, the gaming system thus only displays the notes on the reels and no other symbols on the reels based on such notes. In various other embodiments, one or more of the notes can themselves be used as the symbols on the reels (without conversions to other symbols) and one or more of the notes can be mapped to other symbols on the reels based on such notes.

In various other embodiments, the gaming system displays the symbols on the reels that are mapped from the sheet music or the selected section of the sheet music, but does not display any of the notes of the sheet music or the sheet music itself.

In various embodiments, the gaming system enables the player to select which symbols are displayed (e.g., (a) the notes and the sheet music, or (b) the reel symbols, or (c) the notes and the sheet music and the reel symbols).

In various embodiments, the symbols on the reels can be related to the sheet music, the creators of the sheet music, the players of the sheet music (such as band members that are referred to herein as a musical group), the logos associated with the sheet music, videos associated with the sheet music, and/or other characteristics associated with the sheet music.

It should be appreciated that for the purpose of the present disclosure musical group can include one or more people (such as one or more musicians).

In various embodiments, the symbols on the reels can be unrelated to the sheet music, the creators of the sheet music, the players of the sheet music (such as musical group members), the logos associated with the sheet music and/or players, videos associated with the sheet music, or any other characteristics associated with the sheet music.

While the example sheet music 100 and 200 and the respective sections of the reels shown in FIGS. 2A and 2B may be too small for certain gaming systems with reels, these examples generally show how notes from a section of sheet music can be used to generate and display symbols on reels for plays of a reel game based on that sheet music in accordance with various embodiments of the present disclosure. In various embodiments, larger sections of the sheet music or the entire sheet music for music can be employed and displayed to generate some or all of the symbols on one or more of the reels or other symbol displays of a play of a game.

In various embodiments, for a play of a game, the gaming system moves the sheet music, or an indicator associated with the sheet music as the gaming system rotates the reels of the game. In various such embodiments, the gaming system can display the notes on the reels in a corresponding moving fashion. In various other embodiments, the gaming system can display the symbols on the reels that correspond to the notes on the reels in a corresponding moving fashion. In these embodiments, the gaming system displays the correspondence or indications thereof between the notes on the sheet music and the symbols on the reels.

Example More Complex Sheet Music Mappings

Figure 2C:
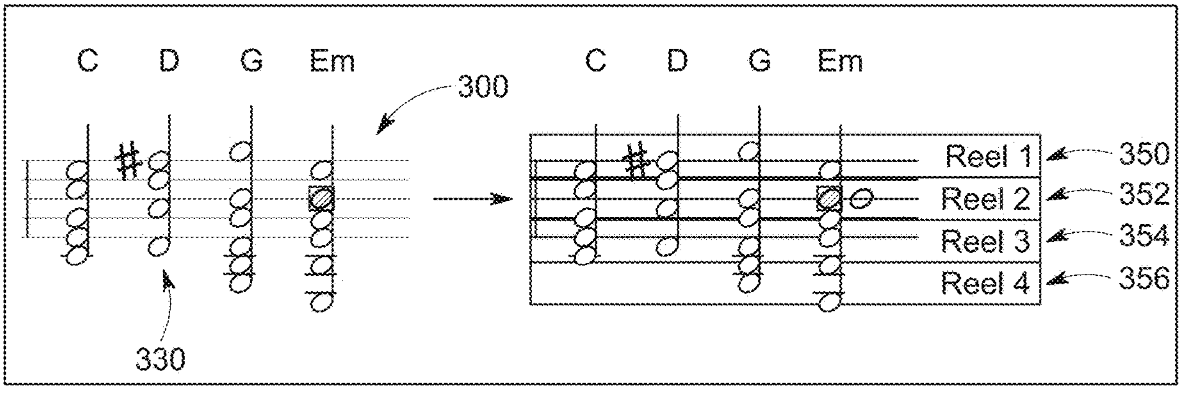
FIG. 2C is a front view of an example more complex section of sheet music and an example mapping of the notes of the sheet music on an example set of reels in accordance with another example embodiment of the present disclosure.

FIG. 2C shows an example of a more complex mapping of sheet music. This example includes sheet music 300 with notes 330 and 4 reels 350, 352, 354, and 356. Multiple notes of the sheet music 300 are mapped to each reel position. A plurality of positions on each reel are thus each associated with multiple notes. In various such embodiments, the notes are counted and a quantity of the notes map to a same reel position to produce a symbol at that position. In various such embodiments, the notes are combined into a chord or a diad (which is two notes played at the same time) or another suitable combination. For example, if the notes C, E, and G are at a same position, they can be combined into the C Major chord and shown as "C" or an associated symbol that indicates the C Major chord such as a box with the letter C in it. Likewise, a C Minor can be shown as Cm. In various such embodiments, the gaming system can map the reel symbols to such combinations of notes.

Figure 2D:
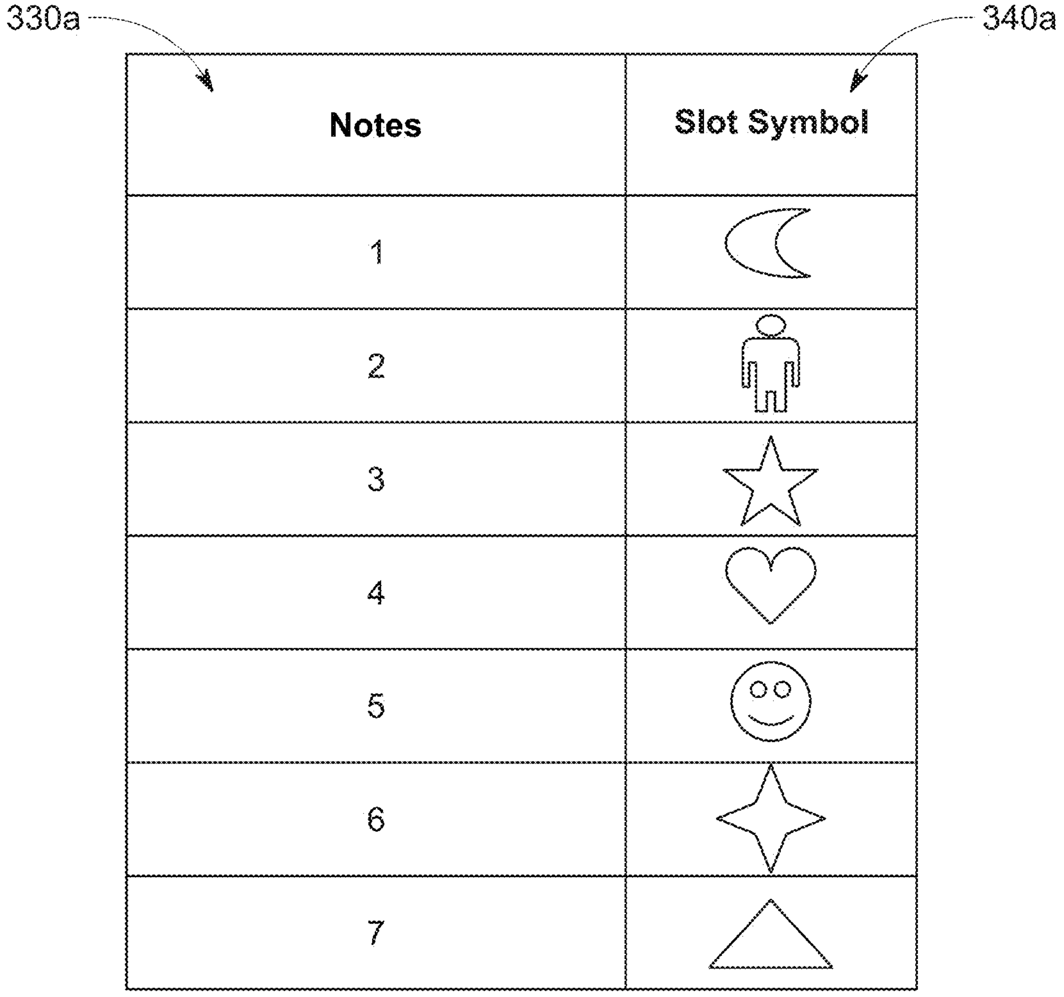
FIG. 2D is a chart of an example mapping of counts of multiple notes for an example reel and the corresponding symbols for that reel in accordance with the example embodiment of FIG. 2C.

In various other more complex mapping configurations, the mapping can be based on a quantity of notes. FIG. 2D shows an example mapping table that maps quantities of multiple notes 330*a* for a reel and the corresponding symbols 340*a* for that reel.

In various other embodiments, the mapping table can have a range of notes (such as 3 to 5 notes) that map to a single symbol (such as a red heart).

Figure 2E:
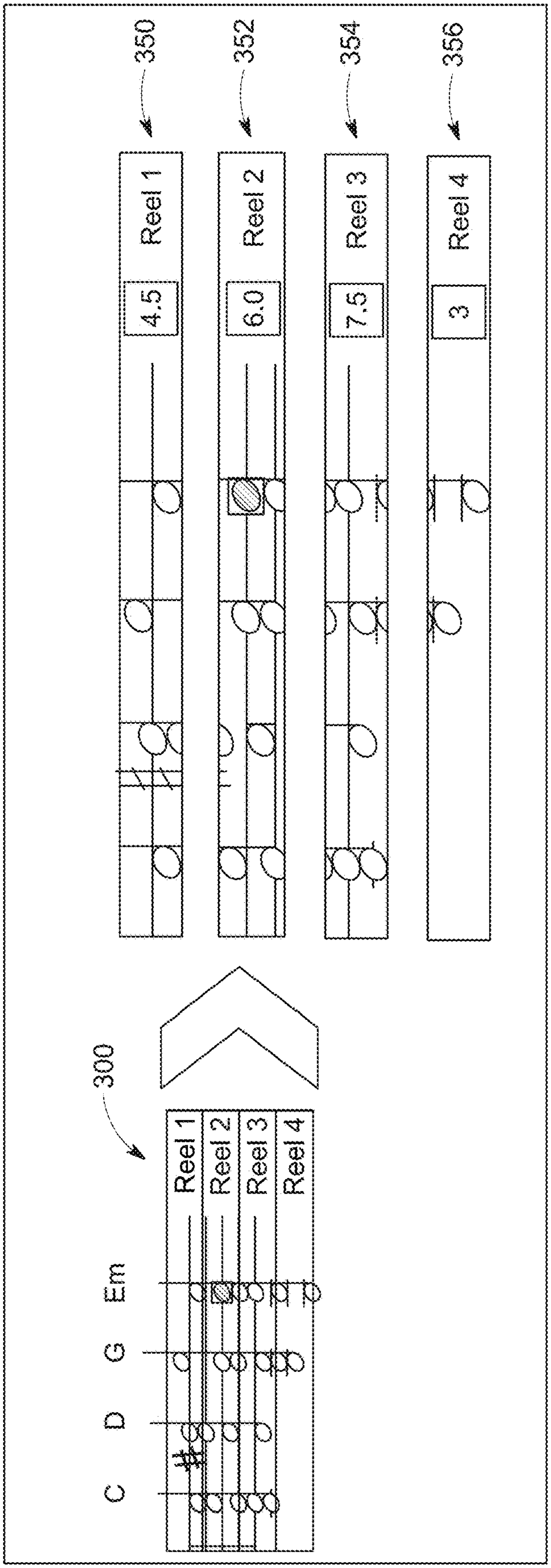
FIG. 2E is a front view of an example section of the sheet music and an example mapping of the notes of the sheet music on an example set of reels in accordance with the example embodiment of FIG. 2C.

In various other embodiments, the gaming system can employ half symbols (such as 4.5 symbols landing in on the reel). In various such embodiments, the mapping can round up or down. In one such example, the rounding is downwardly. FIG. 2E shows example reels 350, 352, 354, and 356 overlayed onto the sheet music 300. In this example, there are 4.5 notes on reel 1 (reel 350), 6 notes on reel 2 (reel 352), 7.5 notes on reel 3 (reel 354), and 3 notes on reel 4 (reel 356). In this example embodiment, the quantity of these notes are rounded down to 4, 6, 7, and 3 notes, respectively.

Figure 2F:
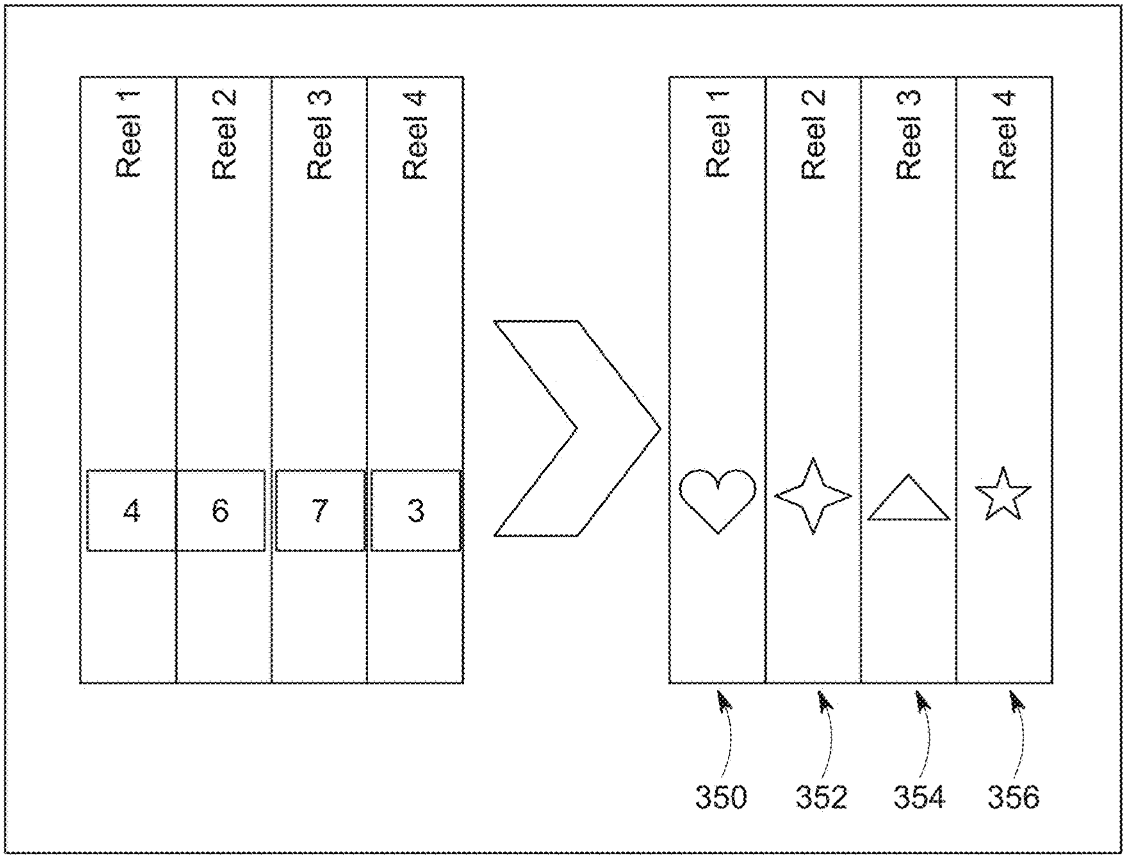
FIG. 2F is a front view of example reels with example note counts and an example mapping of the note counts on an example set of four vertical reels in accordance with the example embodiment of FIG. 2C.

Another example result of this type of mapping is shown in FIG. 2F where the reel symbols are based on the counts and include a heart symbol on reel 1 (reel 350), a four point star symbol on reel 2 (reel 352), a triangle symbol on reel 3 (reel 354), and a five point star symbol on reel 4 (reel 356).

In various other example embodiments, the reels can slice one or more notes in half resulting in half of a note being on each of two reels (such as half a note on reel 1 (reel 350) and the other half of the note on reel 2 (reel 352)). In various such embodiments, the symbols for reel 1 and reel 2 can overlap such that the half note on each reel 1 and reel 2 counts as a note for both reel 1 and reel 2. The half notes are used as an example method to show the slicing of the sheet music in accordance with the present disclosure.

In the above example embodiments, the quantities of the notes are employed for the more complex mapping, but it should be appreciated that other mapping methods for complex mapping of sheet music can be employed in accordance with the present disclosure. For example, the notes themselves can be combined in various mapping configurations. In various such embodiments, when notes are combined, identifiers such as names can be assigned to such combinations of notes. For example, a G note and an E note can be combined into an E Minor (Em) and then mapped to one of the reels.

Figure 2G:
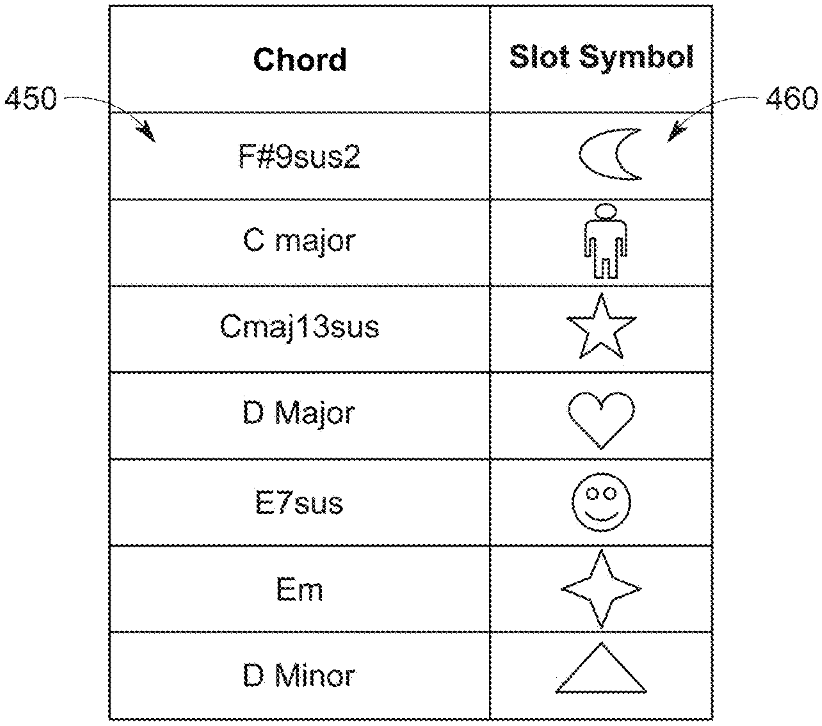
FIG. 2G is a chart of an example chord mapping table in accordance with another example embodiment of the present disclosure.

FIG. 2G shows an example chord mapping table in accordance with another example embodiment of the present disclosure. This example table shows how chords 450 from sheet music can be mapped to different symbols 460. In other embodiments, two or more multiple chords can be mapped to a same symbol. Additionally, chords of a single note (not shown) such as a single C note can be called a Chord "C Note" for such mapping purposes. In various embodiments, the chords can be any chords of a family such as the "C" chord family. In such embodiments, a C Major, C Minor, Csus4, Cadd2, C6, CMaj7, etc. can all be mapped to the same symbol or a set of symbols.

Figure 2H:
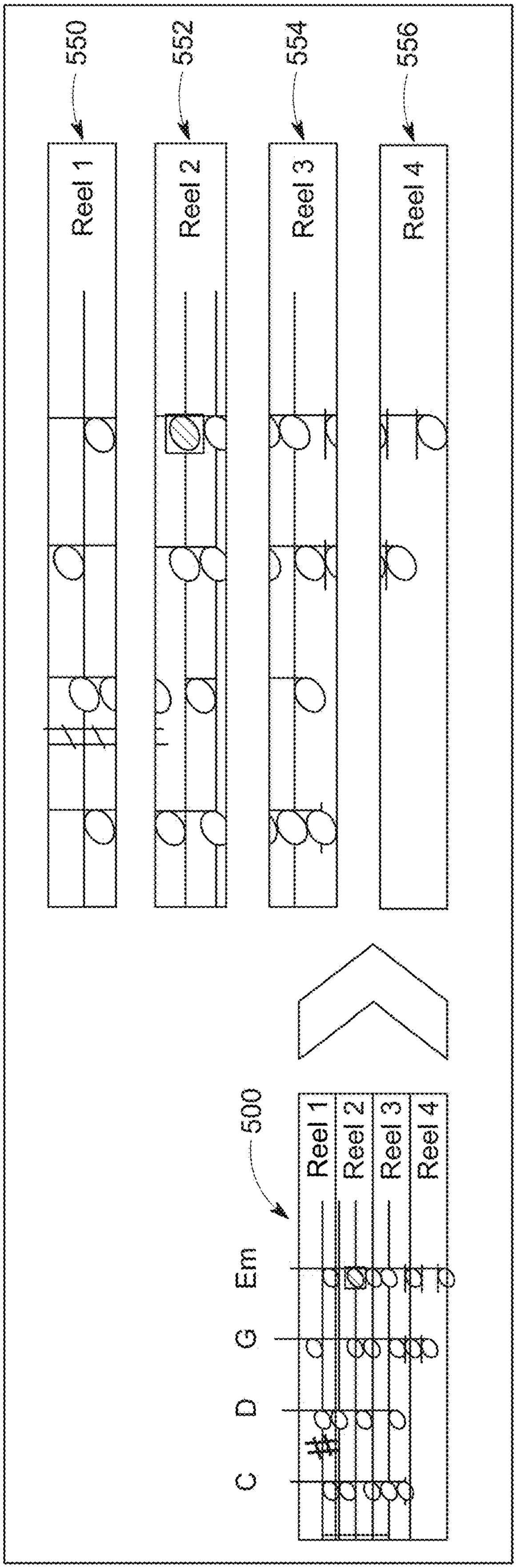
FIGS. 2H and 2I are front views of another example section of sheet music and an example mapping of the notes of that sheet music on an example set of reels in accordance with another example embodiment of the present disclosure.
Figure 2I:
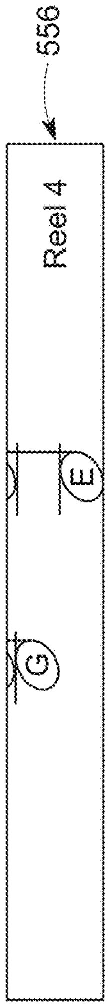

FIG. 2H shows another example mapping that slices the sheet music 500 onto reels 550, 552, 554, and 556. In this example mapping, half notes (i.e., notes cut in half by the slicing) are ignored, and entire notes are used for the chords. For reel 4 (reel 556), the notes "G" and "E" are shown with the letters. This mapping has the G and E notes as an E Minor ("Em") on reel 4 (reel 556) as best shown in FIG. 2I.

Figure 2J:
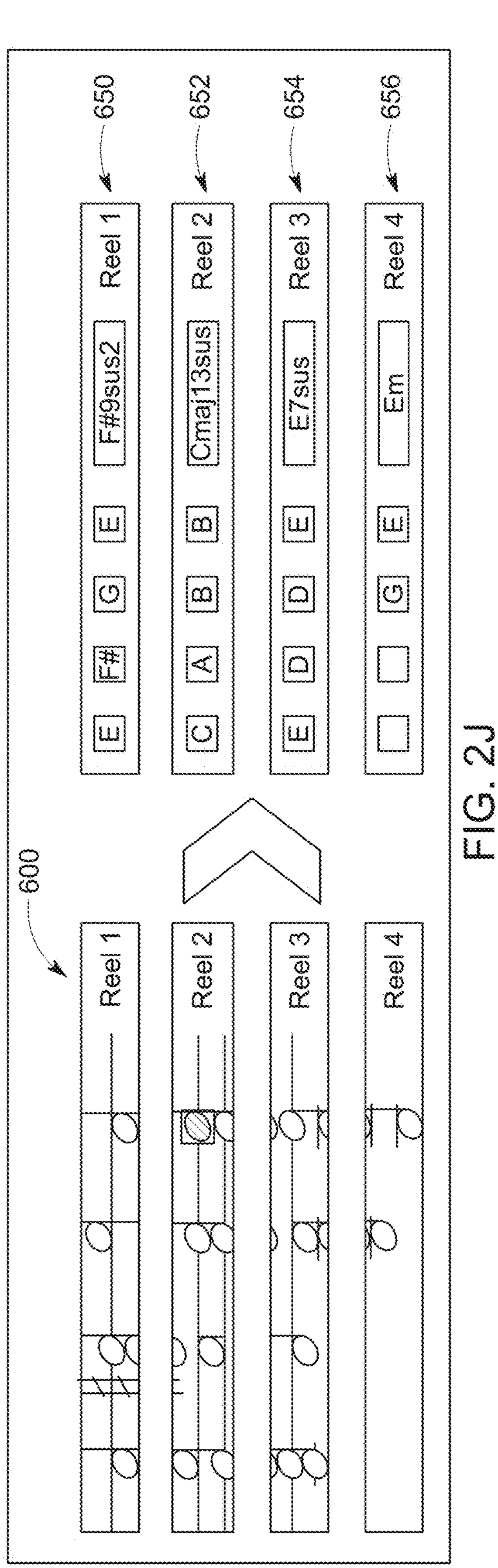
FIG. 2J is a front view of another example section of sheet music and an example mapping of the notes of that sheet music on an example set of reels in accordance with another example embodiment of the present disclosure.
Figure 2K:
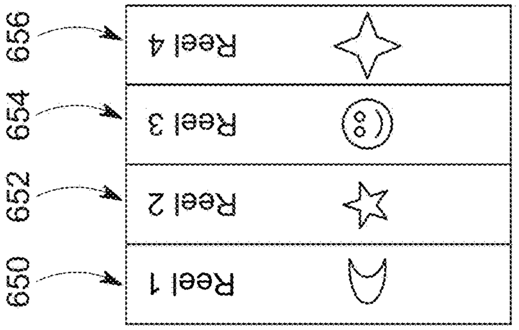
FIG. 2K is a chart of example reels and symbols thereon based on the mapping in accordance with the example embodiment of FIG. 2J.

FIG. 2J shows another example mapping that slices the sheet music 600 onto reels 650, 652, 654, and 656. FIG. 2J shows how the reel slicing maps to notes and that collection of notes maps to a chord. For example, reel 3 (reel 654) has note E, note D, another note D, and another note E. Note E and note D are identified as the E7sus chord so the E7sus chord can be assigned to reel 3 (reel 654). The results of mapping a section of sheet music in this manner is shown in FIG. 2K with the respective symbols on the reels being mapped from the notes.

The present disclosure further provides that one or more suitable specific paytables can be employed for each specific mapping. For example, with reference back to FIG. 2C, the paytable for that mapping could pay for a C Major on one reel or a C Major on multiple reels. The mapping shows that C Major on Reel 1, Reel 2, and Reel 3 (but no note on Reel 4 in that first position). The payable can, for example, indicate C Major on the first 3 reels pays 100 credits. The E Minor is the last chord shown and it extends across all 4 reels so the paytable can, for example, indicate E Minor across all 4 reels pays 500 credits.

Thus, it should be appreciated that there are numerous different possible paytables that can be employed for each mapping, or for the different mappings in accordance with the present disclosure. Each paytable can be based on various components or characteristics such as but not limited to: (1) the quantities and positions of the notes on the sheet music employed, (2) how the notes are mapped to symbols on the reels, the selection method for sections of the sheet music employed, (3) the awards that can be won, (4) the desired volatility, and (5) the desired average expected payback percentage.

In various embodiments, the sheet music used and the mapping between the sheet music and the reels is complex in other manners. For example, in certain embodiments, the sheet music includes notes that appear on the twelve positions directly on the staff, and above or below the staff, thereby creating dozens of possible locations that a note could land at any time. Since most reel games do not includes dozens of reels, the present disclosure provides various other methods for mapping such notes to the reels. In various embodiments, based on the range of positions of the notes on the sheet music, the gaming system employs the highest and lowest note positions and then divides those positions onto the reels. For example, if the score on the sheet music has notes spanning 24 positions and there are 4 reels, the notes are divided into 6 bands for mapping purposes.

The present disclosure further provides that one or more of the components of the sheet music can be mapped to other gaming system components or triggering symbols for gaming system components such as but not limited to modifiers (such as multipliers), wild symbol, cards, keno balls, bingo spots, wheel positions, etc.

Example Sheet Music Movement Displays

As mentioned above, in various embodiments, the gaming system can display the sheet music moving (such a linearly moving or rotating) before, during, and/or after a play of a game.

In various embodiments, the gaming system can display the sheet music moving at a rate that is independent from the timing of the components (such as the notes) of the sheet music.

In various embodiments, the gaming system can display the sheet music moving at a rate that is based specifically on the timing of the component (such as the notes) of the sheet music. In various such embodiments, the gaming system can display the sheet music moving based on a feature of the sheet music (such as based on 90 beats per minute of the sheet music).

In various embodiments, the gaming system can cause the sheet music to stop moving based on a selected section of the sheet music such as a pre-determined section of the sheet music for a play of a game.

In various embodiments, the gaming system can cause the sheet music to stop moving based on a randomly determined section of the sheet music for a play of a game.

In various embodiments, the gaming system can cause the sheet music to stop moving based on one or more pre-determined components (such as set of notes) of the sheet music that the gaming system has determined to display for a play of the game.

In various embodiments, the gaming system can cause the sheet music to stop moving based on one or more randomly determined components (such as a set of notes) of the sheet music that the gaming system has determined to display for a play of the game.

In various embodiments, the gaming system displays the sheet music stationary, and one or more indicators associated with the sheet music moving and stopping to indicate a section of the sheet music or components (such as notes) on the sheet music.

In various embodiments, the gaming system displays the sheet music moving and one or more indicators associated with the sheet music moving and stopping to indicate a section of the sheet music or components (such as notes) on the sheet music.

In various embodiments, for plays of a game, the gaming system displays the sheet music moving (such as rotating) along with the produced audio of the sheet music, and separately displays the corresponding mapped reels rotating.

In various embodiments, for plays of a game, the gaming system does not display the sheet music moving or at all, and displays the corresponding mapped reels rotating instead.

In various embodiments, for plays of a game, the gaming system displays the sheet music moving in a first (such as horizontal) direction and displays the corresponding mapped reels rotating in a second (such as vertical) direction and which is transverse to the first direction.

Audio Output of Audio Based on Sheet Music

In various such embodiments, the gaming system does not output the audio based on the sheet music.

In various such embodiments, the gaming system outputs the audio based on the sheet music. For purposes of this disclosure, the terms music or song that refers to the sounds produced using the sheet music are used interchangeably herein.

In various embodiments, the gaming system causes its sound producing device(s) (such as its speaker(s)) to output audio of the music or song of the sheet music associated with plays of the respective games that use the sheet music in association with the generation and display of the symbols for the reels for the plays of the game. In various such embodiments, the gaming system outputs such music on a continuous basis (such as before, during, and after plays of the game). In various other embodiments, the gaming system outputs such music on a non-continuous basis (such as during each play of a game). In various embodiments, the gaming system outputs the music based on the notes on the sheet music as they or symbols associated with the notes pass a certain point (such as relative to the displayed reels such as when they pass a center payline associated with the reels).

In various embodiments, the gaming system displays the sheet music moving (such as rotating) along with the audio of the sheet music, and does not display the corresponding mapped reels rotating.

In various embodiments, the gaming system displays the sheet music moving (such as rotating) along with the audio of the sheet music, and an overlay of the corresponding mapped reels rotating over the sheet music.

In various embodiments, the gaming system displays the sheet music moving (such as rotating), along with the audio of the sheet music, and when the sheet music stops spinning, the gaming system displays the displayed notes being respectively replaced by the corresponding mapped symbols.

In various embodiments, the gaming system displays the sheet music moving (such as rotating), along with the audio of the sheet music, and alternatively displays the notes and the corresponding mapped symbols (such as changing between the displays every 2 seconds).

In various embodiments, the gaming system displays the sheet music moving (such as rotating), along with the audio of the sheet music, and only displays the symbols on the reels when they result in a winning outcome (such as when the occur on a winning payline).

In various embodiments, the audio of the sheet music is a synthesized version of the song (such as MIDI or similar). This makes it possible for a gaming system to employ almost any sheet music, and use such music for the various embodiments of the present disclosure.

In various embodiments, since some music is popular and people know the musical group that plays them, the audio of the sheet music employed is from such musical group. For example, many people know a Beatles song, and want to hear the actual recording of the song by the Beatles. Thus, in various embodiments, the gaming system employs the actual recording of the music of the sheet music instead or in addition to the simulated notes of the sheet music. In various such embodiments, the gaming system outputs the Beatles music as it was recorded by the Beatles and also displays the sheet music moving with the movement of the sheet music in sync with the audio outputted.

In various embodiments, the gaming system provide vocal tracks played as notes. However, when listening to a song with the vocal played as notes, the words are lost. In various embodiments, the gaming system does not play the vocal track as notes but rather outputs a vocal synthesis or the actual voice recording. In various embodiments, the gaming system displays the text of the words of the song along with the display of the sheet music.

In various embodiments, when the gaming system outputs the audio of the sheet music in the correct timing and synchronization of instruments, the player may be able to perceive that the music is "correct." However, in other embodiments, the gaming system can output audio of the sheet music too fast, too slow, in an incorrect key (such as with wrong notes), or with two or more of the instruments out of sync. In certain such embodiments, this can be done to provide an anticipation or indication to the player of an upcoming event such as but not limited to an upcoming winning event. For example, the gaming system can start outputting the audio of the sheet music with the instruments out of sync and slowly coming into sync giving the perception that the play of the game is nearing a win. In other example embodiments, the gaming system outputs the audio of the sheet music in a faster manner to indicate a winning streak or in a slower manner to indicate a losing streak.

It should be appreciated from the above that various embodiments of the present disclosure provide a gaming system configured to: (1) display sheet music and a component of the sheet music; (2) display part of a reel; (3) display an indication of a mapping of the component of the sheet music onto the reel; and (4) display an indication of an outcome based on the mapping of the component of the sheet music onto the reel. In various such embodiments, the gaming system is configured to display the component of the sheet music on the reel. In various such embodiments, the gaming system is configured to display a reel symbol on the reel, wherein the reel symbol corresponds to the component of the sheet music, and wherein the reel symbol is different than the component. In various such embodiments, the component of the sheet music is a note. In various such embodiments, the component is one of a plurality of different components of the sheet music, the reel is one of a plurality of reels, and gaming system is configured to: (a) display part of each of the plurality of reels, (b) display indications of mappings of the plurality of different components of the sheet music onto the plurality of reels, and (c) display an indication of an outcome based on the mappings of the plurality of different components of the sheet music onto the plurality of reels. In various such embodiments, the plurality of different components of the sheet music are a plurality of different notes. In various such embodiments, the gaming system is configured to display the plurality of different components of the sheet music on the plurality of reels. In various such embodiments, the gaming system is configured to display a plurality of different reel symbol on the plurality of reels, wherein each of the different reel symbols corresponds to a different one of the plurality of different components of the sheet music, and wherein the plurality of different reel symbols are different than the plurality of different components. In various such embodiments, the gaming system is configured to display an additional component of the sheet music and an indication of the additional component resulting in a secondary outcome. In various such embodiments, the gaming system is configured to display an indicator moving and stopping relative to the sheet music to indicate the component of the sheet music. In various such embodiments, the gaming system is configured to display the sheet music moving and stopping to indicate the component of the sheet music.

It should further be appreciated from the above that various embodiments of the present disclosure provide a gaming system configured to: (1) display sheet music and vocal components of the sheet music; (2) display an indication of a mapping of the vocal components of the sheet music onto a reel; and (3) display an indication of an outcome based on the mapping of the vocal components of the sheet music onto the reel. In various such embodiments, the gaming system is configured to display reel symbols on the reel, wherein the reel symbols correspond to the vocal components of the sheet music, and wherein the reel symbols are different than the vocal components. In various such embodiments, the gaming system is configured to display an additional component of the sheet music and an indication of the additional component resulting in a secondary outcome. In various such embodiments, the gaming system is configured to display an indicator moving and stopping relative to the sheet music to indicate the vocal components of the sheet music. In various such embodiments, the gaming system is configured to display the sheet music moving and stopping to indicate the vocal components of the sheet music.

It should further be appreciated from the above that various embodiments of the present disclosure provide a gaming system configured to: (1) display sheet music and a plurality of different components of the sheet music; (2) display a mapping of the plurality of different components of the sheet music into a single reel symbol on a reel; and (3) display an indication of an outcome based at least in part on the single reel symbol on the reel. In various such embodiments, the reel symbol is different than each of the plurality of components. In various such embodiments, the plurality of components of the sheet music are a plurality of different notes of the sheet music. In various such embodiments, the plurality of components of the sheet music are combined into one of a chord and a diad for the mapping to the single reel symbol.

Example Selection of Sheet Music for Gaming System

In various embodiments, the sheet music employed by a gaming system can be selected in one or more different manners.

In various embodiments, the gaming system uses predetermined sheet music to generate and display components and thus mapped symbols for a play of a game (such as a primary game or a secondary game).

In various embodiments, the gaming system uses the same sheet music to generate and display symbols for multiple different plays of a game (such as a primary game or a secondary game). In various embodiments, the gaming system only includes the sheet music for one song for the game, and thus can employ that same sheet music for each play of the game.

In various embodiments, the gaming system uses different sheet music to generate and display symbols for multiple different plays of a game (such as a primary game or a secondary game).

In various embodiments, the gaming system uses the same sheet music to generate and display symbols for plays of a primary game and a secondary game triggered from the primary game. In various embodiments, the gaming system uses different sheet music to generate and display symbols for plays of a primary game and a secondary game triggered from the primary game.

In various embodiments, the sheet music employed by a gaming system is selected from a plurality of pre-determined different sheet music.

In various embodiments, the gaming system includes a plurality of different sheet music for plays of a game, and the gaming system selects which sheet music to use for each play of the game (such as on a pre-determined basis or schedule or a randomly determined basis). For example, in various embodiments, the gaming system includes a plurality of different sheet music for plays of a game, and the gaming system randomly selects which of the different sheet music to use for each play of the game. In various embodiments, the gaming system includes a plurality of different sheet music for plays of a game, and the gaming system selects which of the different sheet music to use for each play of the game based on a wager made by the player for the play of the game. In various embodiments, the gaming system includes a plurality of different sheet music for plays of a game, and the gaming system selects which of the different sheet music to use for each play of the game based on a status (such as a player tracking system status) of the player for the play of the game. In various other embodiments, the gaming system enables the player to select which of the different sheet music to use for one or more plays of the game.

In various embodiments, the sheet music employed by a gaming system is player selectable from a plurality of pre-determined different sheet music (such as sheet music stored in a database). In various such embodiments, the selectable sheet music can be organized by genre (type of music), musical group, etc.

In various embodiments, the gaming system displays indications of a plurality of different songs and enables the player to select one of the songs to determine the sheet music used for one or more plays of a game.

In various embodiments, the gaming system displays indications of different sheet music for different songs and enables the player to select one of the different sheet music to the sheet music used for one or more plays of a game.

In various embodiments, the gaming system displays indications of different musical groups, enables the player to select one of the different groups, and then the gaming system selects the sheet music of the musical groups for the sheet music used for one or more plays of a game.

In various embodiments, the gaming system displays indications of different musical groups, enables the player to select one of the different groups, displays indications of different songs or sheet music of that selected musical group, and enables the player to select such song or sheet music for the sheet music used for one or more plays of a game.

In various embodiments, the gaming system displays indications of different types of music (such as different genres), enables the player to select one of the types, and the gaming system selects the sheet music of the type for the sheet music used for one or more plays of a game.

In various embodiments, the gaming system displays indications of different types of music (such as different genres), enables the player to select one of the types, displays indications of different songs or sheet music of that selected type, and enables the player to select such song or sheet music for the sheet music used for one or more plays of a game.

In various embodiments, the gaming system can make certain sheet music available only to certain players. For example, in various embodiments, player loyalty club members get more sheet music to select from. In other various embodiments, the level of club status (gold, silver, etc.) determines the available sheet music for a player.

In various embodiments, the gaming system can require a player to pay for the gaming system to use certain sheet music. In various such embodiment, the payment can be monetary or non-monetary (such as via player loyalty points).

In various embodiments, the gaming system can enable the player to provide the sheet music via a suitable device such as but not limited to using a USB connection, a wireless transfer from a player mobile device, or by providing a URL to the sheet music on the internet.

In various embodiments, the gaming system is configured to enable the player to select the sheet music and the sheet music determines the paytable or random numbers chosen. For example, the player chooses sheet music from musical group A. With each note played by the gaming system, the random number generator is cycled (numbers chosen) thus making the player choice of sheet music impact the outcome of the game.

In various embodiments, the sheet music playing can cause a switch or change to the paytable.

In various embodiments, the gaming system can enable the player to win sheet music or unlock sheet music such as by winning in a game, based on an amount of game play, based on an amount wagered, based on an amount of time played, or another event.

As mentioned above, in various embodiments, based on the selected section of the sheet music for a play of a game, the components (such as the notes) and thus the corresponding mapped symbols thereof are used in the symbol evaluations and award determinations for the play of the game.

In various other embodiments, the notes are not used in the symbol evaluation for the plays of the games. Rather, in such embodiments, the quantity of notes that land on each reel are employed for such evaluation for the play of the game.

For example, in one example reel mapping, zero, 1, 2, 3, or more notes can land on a reel payline depending on the quantity of reels and the sheet music selected. Each different quantity of notes can map to a reel symbol. This can be employed for sheet music with multiple notes per position on a reel. For example, if the sheet music is 4 beats per bar, and the mapping includes 4 slot symbols per bar, there can be 2 eight notes or 4 sixteenth notes in the place of a quarter note, thus allowing 2 or 4 notes to land on a same position for a reel.

Figure 2L:
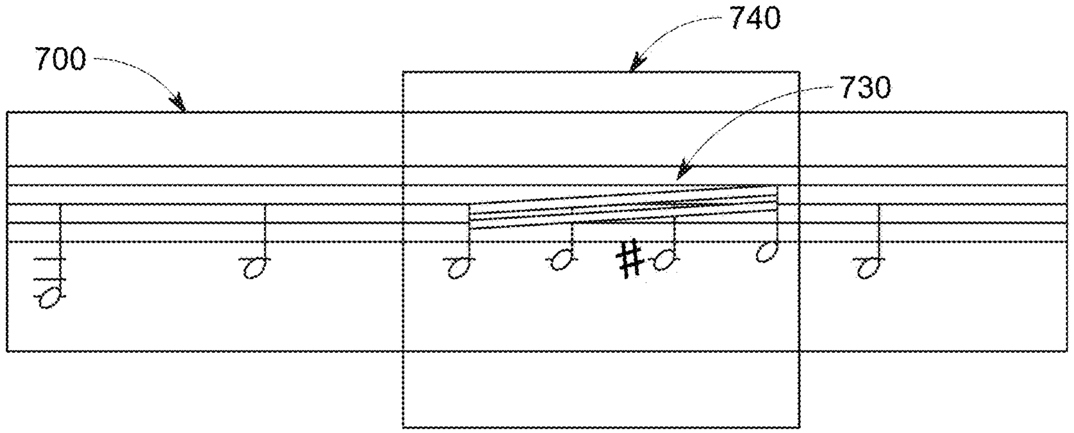
FIG. 2L is a front view of an example display of sheet music and a display box indicating the notes of the sheet music that are selected for a play of a reel game in accordance with an example embodiment of the present disclosure.

FIG. 2L shows an example of a display of selected sheet music 700 and a display box 740 indicating the notes 730 of the sheet music 700 that are selected for a play of the game. In this example, the bar is 4/4 (4 beats per bar), and the bar has a quarter note, a quarter note, 4 sixteenth notes, and then a quarter note. In this example, the gaming system can output the song with any suitable quantity (such as 16) beats per bar. As indicated above, the gaming system can be configured to select these notes in a random manner or in a pre-determined manner after selecting the sheet music. In various embodiments, the gaming system can be configured based on the effective time signature of the sheet music to eliminate complicated scenarios. For example, if the gaming system employs a 4/4 timing, and there are sixteenth notes, the gaming system can effectively change the signature to 16 notes per bar and therefore 16 slot symbols/positions per bar.

In another example embodiment, the gaming system can employ a scatter win evaluation (such as 9 winning notes, a payline win with 9 notes on the payline, or a single position on a reel mapping to a symbol as described above).

In various embodiments, the gaming system stops the reels based on the sheet music and randomly selects one or more reels symbols that do not correlate to the notes or to an absence of notes on the sheet music. These embodiments can be employed, for instance, when the gaming system cannot find a winning combination or to make the game logic simple.

As indicated above, the gaming system can spin and stop the reels, output the audio of the sheet music while the reels spin, and land at a random position of the sheet music. When the reels stop, the music stops, the gaming system maps the notes to the corresponding symbols, displays those symbols, evaluates the corresponding symbols for winning symbols or winning symbols combinations, and provides any awards based thereon to the player.

It should be appreciated from the above that various embodiments of the present disclosure provide a gaming system configured to: (1) display an indication of sheet music selected by a player; (2) display part of the sheet music; (3) display a component of the sheet music; (4) display an indication of a mapping of the component of the sheet music onto a reel; and (5) display an indication of an outcome based on the mapping of the component of the sheet music onto the reel. In various such embodiments, the component is a note of the sheet music. In various such embodiments, the gaming system is configured to enable the player to, via an input device, select the sheet music. In various such embodiments, the gaming system is configured to enable the player to, via an input device, select the sheet music via selection of a type of music. In various such embodiments, the gaming system is configured to enable the player to, via an input device, select the sheet music via selection of a musical group. In various such embodiments, the gaming system is configured to enable the player to, via an input device, select the sheet music via selection of a song. In various such embodiments, the gaming system is configured to enable the player to, via an input device, select the sheet music from a person. In various such embodiments, the gaming system is configured to enable the player to, via an electronic communication device of the player, select the sheet music.

It should further be appreciated from the above that various embodiments of the present disclosure provide a gaming system configured to: (1) display indications of a plurality of different songs; (2) display indication of a player selected song from the plurality of different songs; (3) display part of sheet music for the player selected song; (4) display a component of the sheet music; (5) display an indication of a mapping of the component of the sheet music onto a reel, and (6) display an indication of an outcome based on the mapping of the component of the sheet music onto the reel. In various such embodiments, the component is a note of the sheet music. In various such embodiments, the plurality of different songs of all of a same type of music. In various such embodiments, the gaming system is configured to, before the display of the indications of the plurality of different songs, cause a display of indications of a plurality of different types of music, and cause a display of an indication of a player selected type of music from the plurality of different music types. In various such embodiments, the plurality of different songs of all of a same musical group. In various such embodiments, the gaming system is configured to, before the display of the plurality of different songs, cause a display of indications of a plurality of different musical groups, and cause a display of an indication of a player selected musical group from the plurality of different musical groups.

It should further be appreciated from the above that various embodiments of the present disclosure provide a gaming system configured to: (1) display indications of different sheet music for different songs; (2) display indication of a player selected sheet music from the different sheet music; (3) display indication of the player selected sheet music; (4) display a component of the player selected sheet music; (5) display an indication of a mapping of the component of the player selected sheet music onto a reel; and (6) display an indication of an outcome based on the mapping of the component of the sheet music onto the reel. In various such embodiments, the component is a note of the player selected sheet music. In various such embodiments, the different sheet music is for different types of music. In various such embodiments, the gaming system is configured to, before the display of the different sheet music, cause a display of indications of the different types of music, and cause a display of an indication of a player selected type of music from the different types of music. In various such embodiments, the plurality of different sheet music from different musical groups. In various such embodiments, the gaming system is configured to, before the display of the different sheet music, cause a display of indications of the different musical groups, and cause a display of an indication of a player selected musical group from the different musical groups.

Unmappable Sheet Music

For certain sheet music, the notes may not readily mappable or mappable at all to symbols to create suitable reels and a suitable paytable. For example, a paytable can have an 85% to 99% average expected return to the player. Sheet music for a popular song may not be mappable to such a desired paytable and thus may not be viable.

To address this issue in one way, in various such embodiments, the gaming system can randomly select the sheet music for a player selected genre of sheet music. Thus, the sheet music is not specifically selected by the player, but rather selected by the gaming system.

To address this issue in another way, in various embodiments, the gaming system can be configured to select and use sheet music using one of a plurality of different central determination configurations in accordance with the present disclosure.

In various such embodiments, the gaming system can select the award for a play of a game, such as a win of 500 credits, and then locate the place on the sheet music that has notes that will provide that win (such as E Minor) that results in that award The gaming system can then display the indication of the section of the sheet music and spin and stop the reels at positions that display the E Minor. Such embodiments can be applied to any sheet music. This configuration also enables a gaming system to enable a player to select any sheet music they like to use on the gaming system.

In various embodiments, the sheet music can be loaded into the gaming system and the gaming system can analyze the sheet music by looking at the notes at each time point in the sheet music. For example, for 4 beats per bar, the gaming system can break the music into ¼ bar segments and maps those to reels stops. The gaming system can map positions in the sheet music to outcomes that are randomly chosen until the paytable reaches a desired payback (such as 92%).

Sheet Music for Multiple Instruments

In the various embodiments described above, the sheet music for one instrument is mapped to multiple reels. For various music, more than one instrument is employed to produce the music. Such music can have different sheet music for different instruments such as different sheet music for each different instrument. For example, it is common for a musical group to have a drummer, a bass player, a lead guitar player, and a rhythm guitar player. In this example, there can be separate sheet music for two or more or each of the five different instruments.

Figure 2M:
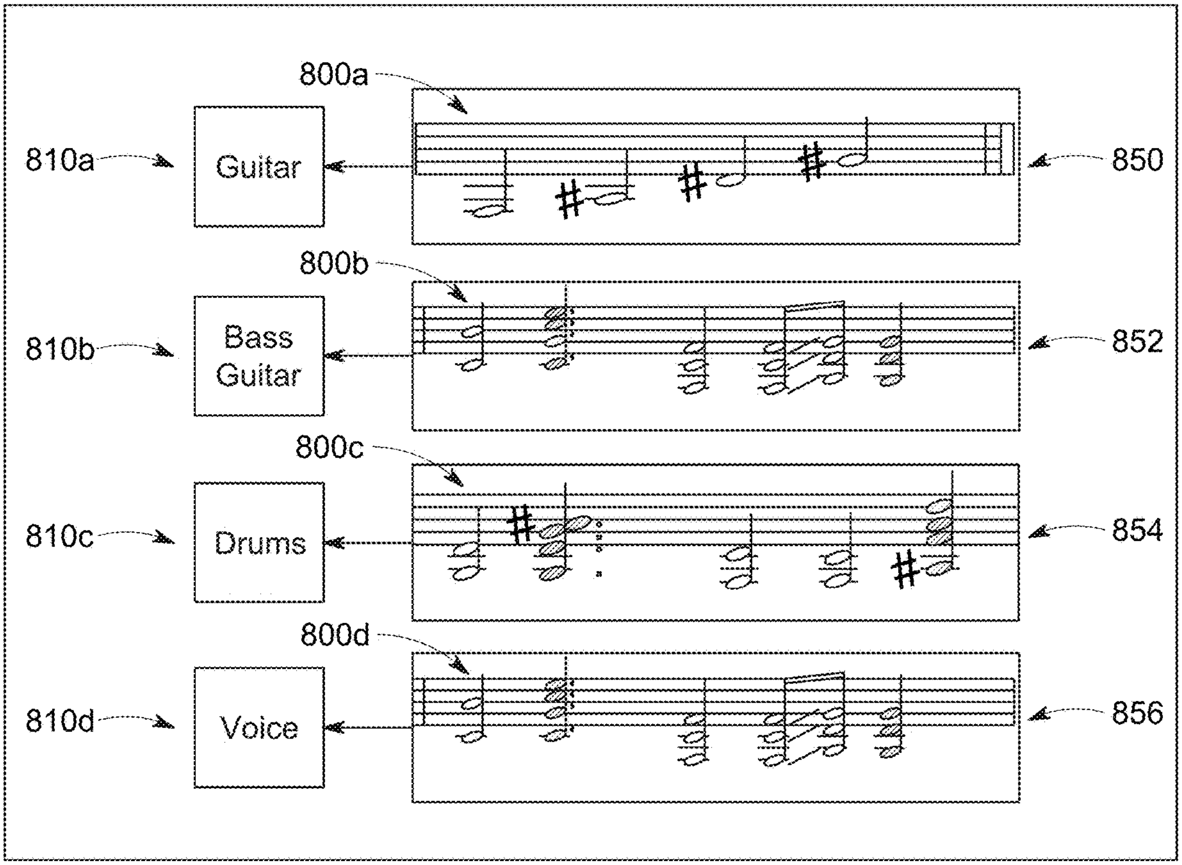
FIG. 2M is a front view of the sheet music for multiple instruments and an example mapping of the sheet music to an example set of reels in accordance with another example embodiment of the present disclosure.

In various embodiments, the separate sheet music for each instrument is separately mapped to one or more reels. For example, where there five instruments, the sheet music for each instrument can be mapped to five separate reels. For example, FIG. 2M shows the sheet music 800*a*, 800*b*, 800*c*, and 800*d* for four different instruments 810*a*, 810*b*, 810*c*, and 810*d*, separately mapped to each of the four respective reels 850, 852, 854, and 856.

In various such embodiments, the sheet music for each instrument can be displayed by the gaming system. However, this can take larger than desired portions of the display screens of the gaming system. Thus, in various embodiments, the gaming system can display summarizations of the instruments in a single display. For example, if the guitar is playing C, E, and G, then guitar reel can map to C Major.

In various embodiments, for each instrument, the mapping includes "playing a note" or "silent" mapped to the reel associated with that instrument. It should be noted, that "silence" can be a note indicating the absence of music from one or more instruments at where the reels stops. This creates a reel with either an empty space or a symbol at each respective position on the reel. The gaming system can then use any symbol for a mapped symbol. The gaming system can thus display the same or a different symbol for the exact same chord. For example, a C Major in one part of the sheet music can be mapped to a cherry symbol for one position on a reel, and the same C Major (or similar C Major) in another part of the sheet music can be mapped to a watermelon symbol. In various embodiments, this can enable the gaming system to achieve a desired average expected payback percentage via selection of the respective different symbols mapped to the same note. In various embodiments, the mapping for each instrument can be different. For example, a C Major Chord for a guitar can be mapped to a rose symbol while the same C Major Chord for a bass can be mapped to a watermelon symbol.

Figure 2N:
FIGS. 2N and 2O are front views of an example mapping for notes of sheet music for four example instruments to example reel symbols and example reels in accordance with another example embodiment of the present disclosure.
Figure 2N:
Figure 2N:
Figure 2N:
Figure 2N:
Figure 2N:
Figure 2N:
Figure 2N:
Figure 2N:
Figure 2N:
Figure 2N:
Figure 2N:
Figure 2N:
Figure 2N:
Figure 2N:
Figure 2N:
Figure 2N:
Figure 2N:
Figure 2N:
Figure 2N:
Figure 2N:
Figure 2N:
Figure 2N:
Figure 2N:
Figure 2N:
Figure 2N:
Figure 2N:
Figure 2N:
Figure 2O:
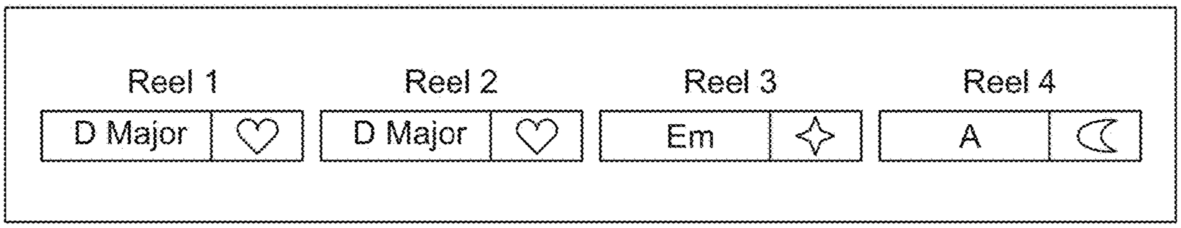

FIG. 2N shows an example instrument mapping for the sheet music with the following four instruments: guitar, bass, drums, and vocals. It should be noted that in various embodiments, vocals can be considered to be an instrument. In this example, the guitar, the bass, and the drums all have the same mappings. The vocals have a different mapping in this example because a human voice can sing a note but not a chord (multiple notes). This example is meant to illustrate embodiments of the present disclosure and not to limit the present disclosure. For example, the vocal table can have A #, C #, etc. (not shown). In various embodiments, the chords can be any chords of a family such as the "C" chord family. This means that each of a C Major, C Minor, Csus4, Cadd2, C6, CMaj7, etc. can map to the same symbol. This can be applied on a per instrument basis or for two or more or all of the instruments. In the event that the music sheet lands on the guitar playing a D Major, the Bass Playing a D Major, the Drums playing an Em, and the singer singing an A note, the result can be, for example, the reel symbols shown in FIG. 2O. In this example, the sheet music for drums is shown as chords. Since drum music is often drawn onto the sheet music or guitar tablature for the notation, the drums do not actually play those notes. For example, a certain note can map to a symbol and another note can map to the kick drum.

In various embodiments, in the event that the quantity of reels for a game do not match the quantity of the sheet music for the different instruments, the gaming system can be configured to adjust the quantity of reels of the game. In various other embodiments, the gaming system can be configured to adjust the quantity of instruments by making the quantity of reels exactly equal to the quantity of instruments.

In various other embodiments, the gaming system can employ the sheet music for a subset of the instruments for a song. Using the above example of 5 instruments for the song, a gaming system with 4 reels can employ 4 of the 5 instruments (such as by not employing or mapping the sheet music for the vocals) for the 4 reels. In various such embodiments, the gaming system can still output the audio of the singer, but just not employ the sheet music for the singer for the reels or for any symbol evaluations.

In various embodiments where there are multiple instruments, the gaming system can employ the sheet music for the instruments based on the desired hit frequency of payback. For example, the gaming system can employ the sheet music for each of the singer, the drums, the bass, and the guitar mapped to reels 1 through 4 to provide a hit frequency of 25%, or the gaming system can employ the same sheet music for each of the bass, the singer, the guitar, and the drums mapped to reels 1 through 4 to have a hit frequency of 40%. In other words, the order of mapping (due to the different notes and/or frequency thereof for each instrument) employed can affect the hit frequency and the average expected payback.

It should be appreciated from the above that various embodiments of the present disclosure provide a gaming system configured to: (1) display first sheet music and a first component of the first sheet music, the first sheet music being for a first instrument for a song; (2) display second sheet music and a second component of the second sheet music, the second sheet music being for a different second instrument for the same song; (3) display an indication of a first mapping of the first component of the first sheet music onto a first reel; (4) display an indication of a second mapping of the second component of the second sheet music onto a second reel; and (5) display an indication of an outcome based on the mappings of the first component of the first sheet music onto the first reel and the second component of the second sheet music onto the second reel. In various such embodiments, the gaming system is configured to display the first component of the first sheet music on the first reel and the second component of the second sheet music on the second reel. In various such embodiments, the gaming system is configured to display: a first reel symbol on the first reel, wherein the first reel symbol corresponds to the first component of the first sheet music, and wherein the first reel symbol is different than the first component, and a second reel symbol on the second reel, wherein the second reel symbol corresponds to the second component of the second sheet music, wherein the second reel symbol is different than the first component, and wherein the second reel symbol is different than the first reel symbol. In various such embodiments, the first component of the first sheet music is a first note, and the second component of the second sheet music is a second note, and wherein the second note is different than the first note. In various such embodiments, the gaming system is configured to cause an audio output of the song based on the first instrument and the second instrument. In various such embodiments, the gaming system is configured to cause an audio output of the song based only on the first instrument and the second instrument.

It should further be appreciated from the above that various embodiments of the present disclosure provide a gaming system configured to: (1) display first sheet music and first components of the first sheet music, the first sheet music being for a first instrument for a song; (2) display second sheet music and second components of the second sheet music, the second sheet music being for a different second instrument for the same song; (3) display an indication of a first mapping of the first components of the first sheet music onto a plurality of reels; (4) display an indication of a second mapping of the second components of the second sheet music onto the plurality of reels; and (5) display an indication of an outcome based on the mappings of the first components of the first sheet music onto the plurality of reels and the second components of the second sheet music onto the plurality of reels. In various such embodiments, the gaming system is configured to display the first components of the first sheet music on the plurality of reels and the second components of the second sheet music on the plurality of reels. In various such embodiments, the first components of the first sheet music are notes, and the second components of the second sheet music are notes, and wherein the second notes are different than the first notes. In various such embodiments, the gaming system is configured to cause an audio output of the song based on the first instrument and the second instrument. In various such embodiments, the gaming system is configured to cause an audio output of the song based only on the first instrument and the second instrument. In various such embodiments, the gaming system is configured to display a first reel symbol on a first one of the reels, wherein the first reel symbol corresponds to a first one of the first components of the first sheet music, and wherein the first reel symbol is different than the first one of the first components, and a second reel symbol on a second one of the reels, wherein the second reel symbol corresponds to a second one of the first components of the first sheet music, and wherein the second reel symbol is different than the second one of the first components. In various such embodiments, the gaming system is configured to display: a first reel symbol on a first one of the reels, wherein the first reel symbol corresponds to a first one of the first components of the first sheet music, and wherein the first reel symbol is different than the first one of the first components, and a second reel symbol on the first one of the reels, wherein the second reel symbol corresponds to a first one of the second components of the second sheet music, and wherein the second reel symbol is different than the first one of the second components. In various such embodiments, the gaming system is configured to cause the first mapping of the first components of the first sheet music onto the plurality of reels and the second mapping of the second components of the second sheet music onto the plurality of reels in a predetermined manner. In various such embodiments, the gaming system is configured to cause the first mapping of the first components of the first sheet music onto the plurality of reels and the second mapping of the second components of the second sheet music onto the plurality of reels in a random manner. It should further be appreciated from the above that various embodiments of the present disclosure provide a gaming system configured to: (1) display first sheet music and a first component of the first sheet music, the first sheet music being for a first instrument for a song; (2) display second sheet music and a second component of the second sheet music, the second sheet music being for vocals for the same song; (3) display an indication of a first mapping of the first component of the first sheet music onto a first reel; (4) display an indication of a second mapping of the second component of the second sheet music onto a second reel; and (5) display an indication of an outcome based on the mappings of the first component of the first sheet music onto the first reel and the second component of the second sheet music onto the second reel. In various such embodiments, the gaming system is configured to display the first component of the first sheet music on the first reel and the second component of the second sheet music on the second reel. In various such embodiments, the gaming system is configured to display: a first reel symbol on the first reel, wherein the first reel symbol corresponds to the first component of the first sheet music, and wherein the first reel symbol is different than the first component, and a second reel symbol on the second reel, wherein the second reel symbol corresponds to the second component of the second sheet music, wherein the second reel symbol is different than the first component, and wherein the second reel symbol is different than the first reel symbol. In various such embodiments, the gaming system is configured to cause an audio output of the song based only on the first instrument and the vocals. In various such embodiments, the gaming system is configured to cause the first mapping of the first component of the first sheet music onto the first reel and the second mapping of the second component of the second sheet music onto the second reel in a predetermined manner.

Mapping of Other Features of Sheet Music

The present disclosure further provides for mapping of other features of sheet music to symbols displays (such as reels) for play of games (such as primary and secondary games). For example, sheet music can include additional indications such as but not limited to slides, slurs, vibrato, hammer ons, hammer offs, dotted notes, transitory notes, natural harmonics, and artificial harmonics. In various embodiments such as certain embodiments described above, these additional indications are ignored by the mappings and the gaming system employing such mappings. In various other embodiments, one or more of these additional indications can be employed for the reels or otherwise to determine those game outcomes and awards. For example, if the mapped slot reels display a C Major, the gaming system can provide a 100 credit award, but if the mapped reels display a C Major with a dotted note, the gaming system can provide a play of a secondary game.

It should be noted that “silence” can also be a note that is mapped and indicates the absence of music from one or more instruments where the reels stop.

Player Inputs Associated With Sheet Music

In various embodiment, the gaming system can enable the player to make one or more inputs associated with the displayed sheet music. In various such embodiments, the gaming system displays the symbol displays (such as the reels) of the game and the sheet music, and additionally enables the player to play along with the displayed sheet music such as via a suitable input device. In various embodiments, the input device is an instrument (such as a guitar or drums). In various embodiments, the instrument is one of a real instrument, a toy type instrument, a video instrument, or other suitable mechanical input device (such as a set of one or more buttons).

In various embodiments, the toy musical instrument is not a real musical instrument, but rather a player input device that simulates playing a musical instrument. In various embodiments with real and toy type instruments, the instruments can be completely separate from the gaming system. In various embodiments with real and toy type instruments, the instruments can be connectable (via one or more wires or wirelessly) to the gaming system such that the gaming system can receive signals from such instruments corresponding to the player inputs using such instruments. In various other embodiments, the gaming system can include one or more microphones that enable the gaming system to listen to the music from an instrument played by the player.

Figure 2P:
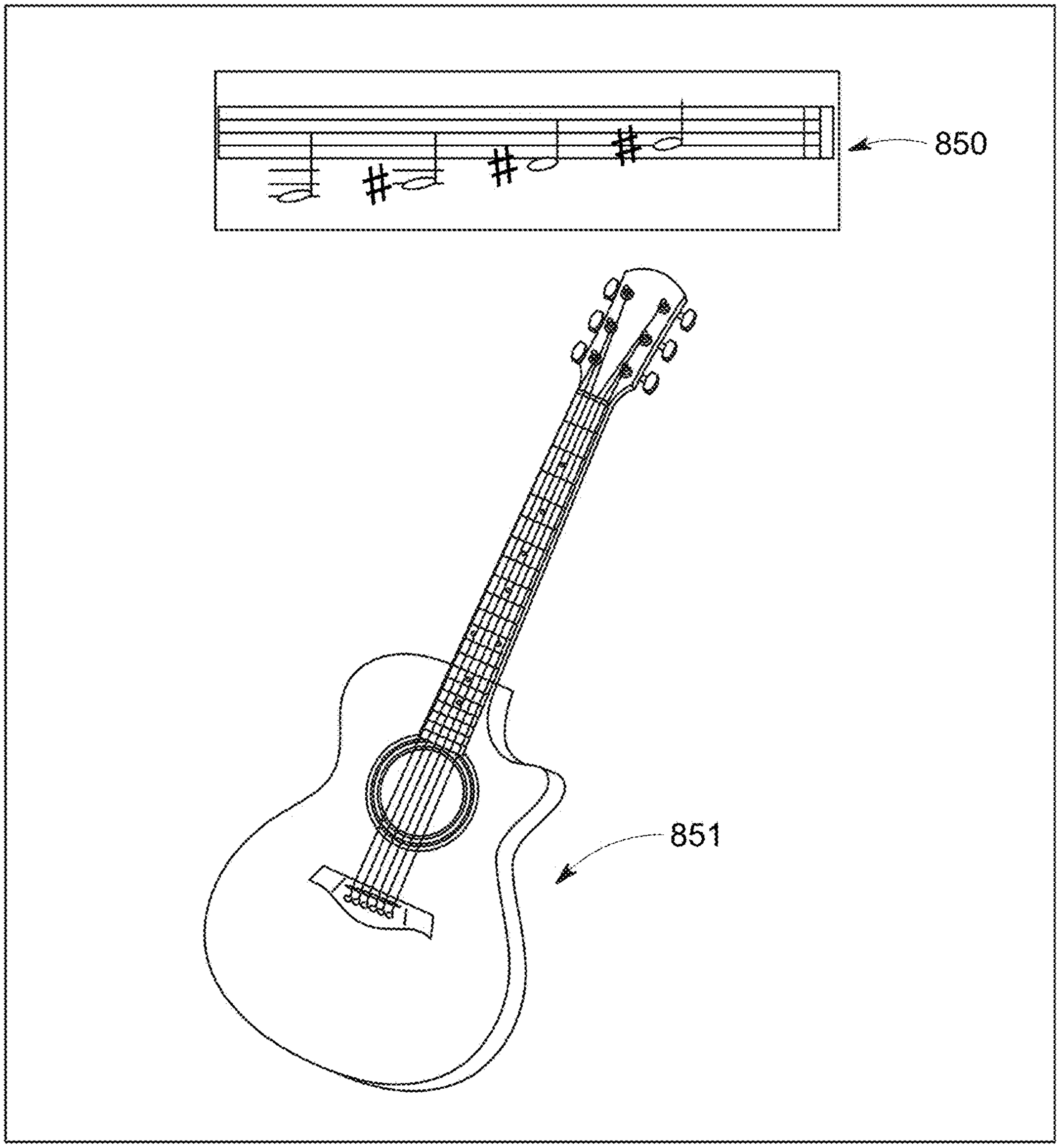
FIG. 2P is a front view of the display of example sheet music for a guitar and a display of an example guitar adjacent to the sheet music in accordance with another example embodiment of the present disclosure.
Figure 2Q:
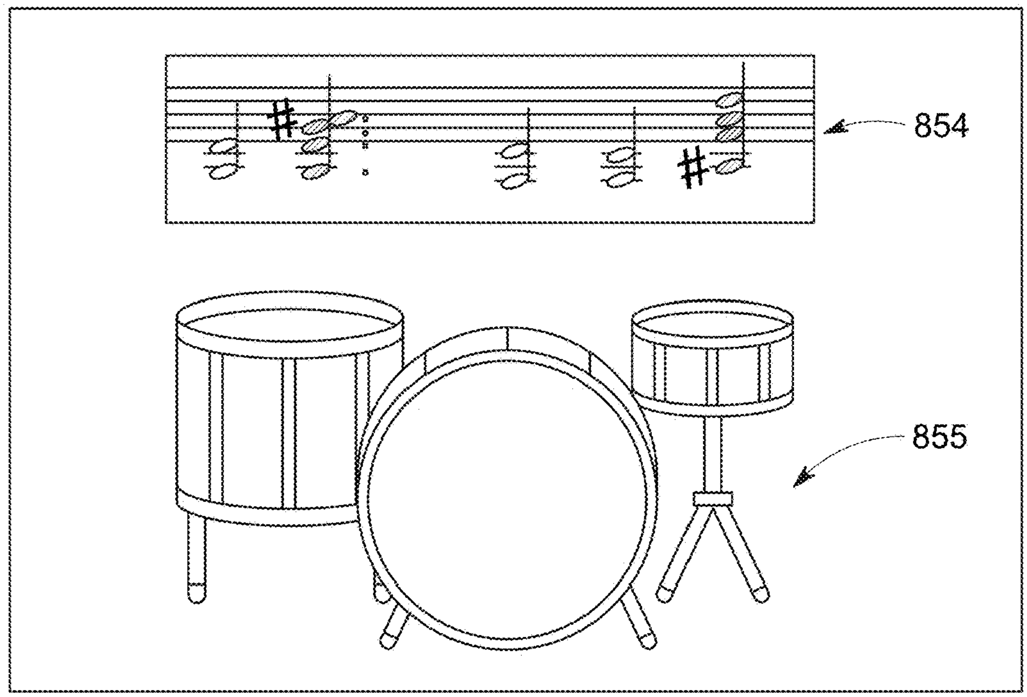
FIG. 2Q is a front view of the display of example sheet music for drums and a display of an example set of drums adjacent to the sheet music in accordance with another example embodiment of the present disclosure.

In various embodiments with video type instruments, the gaming system can display the instruments or parts thereof and enable the player to make one or more inputs using such displayed instruments. For example, two example video instruments displayed adjacent to sheet music for such respective instrument are shown in FIGS. 2P and 2Q. Specifically, FIG. 2P shows the guitar sheet music 850 from FIG. 2M and a video guitar 851. Likewise, FIG. 2Q shows the drums music 854 from FIG. 2M and a set of video drums 855. In these embodiments, the gaming system enables the player to make inputs using such displayed instruments (such as via a touch screen relative to such displayed instruments). While FIGS. 2P and 2Q do not show symbol displays such as reels, various embodiments of the present disclosure provides that the symbol displays such as reels can additionally be displayed in association with the sheet music as described in the various different embodiments explained above.

In various embodiments, the playing of the instrument is solely for the player entertainment and does not cause any additional functions to be provided by the gaming system.

In various embodiments, the playing of the instrument causes one or more additional functions to be provided by the gaming system. The following functions are examples of such functions that can be provided by a gaming system, but are not meant to limit the scope of the present disclosure.

In various embodiments, the gaming system evaluates the player's accuracy and provides one or more functions based on such accuracy. The gaming system can measure the player's accuracy based on the note played by the player and/or the timing of the note relative to the displayed notes on the displayed sheet music (such as before, during, or after a play of a game).

For example, the gaming system can provide one or more additional awards or award opportunities associated with a play of a game (that includes the display of the sheet music) based on such evaluation of the player accuracy. The awards can be monetary or non-monetary awards (such as real or virtual currency or player tracking points).

In various embodiments, the gaming system can display one or more indications of the player's accuracy such as displaying the following message: "You hit 87% of the notes correctly!".

In various embodiments, the gaming system is configured to compare the player to other players who play the respective song and determine the player with the most accuracy over a certain period of time, and the provide a suitable award to the player. For example, the gaming system can provide the player who played the song with the most accuracy during a period of time an award (such as buffet ticket).

In various embodiments, the gaming system is configured to adjust the paytable or average expected payback of a game or for a play of a game directly or partially based on player accuracy. For example, if the player plays the music with 90% accuracy, the gaming system can employ and 90% paytable, and if the player plays the music with a 95% accuracy, the gaming system can employ a 95% paytable. In various such embodiments, the gaming system can be configured to employ a lower limit such that the payback would not go below 85% even if the player measured accuracy falls below 80%. In various such embodiments, the gaming system can be configured to employ an upper limit such that the payback would not go above a certain percentage such as 98%, 99%, or 100%. In such example embodiments, the player's inputs and thus accuracy is thus employed to at least partially determine the awards for the play of the game (by determining the paytable employed). The paytable selected by the gaming system based on the play accuracy can be for a present play of the game or a future play of the game (such as a next play of the game).

In various embodiments such as for the video display of the instrument, the gaming system can be configured to receive inputs for the play of the instrument via the button panel of the gaming system, via buttons displayed by display device and an associated touch screen, or via or a player mobile device. These embodiments can be particularly suited for enabling the player to play with the beat of the music (rather than detailed chords of a song). In various such embodiments, each note is associated with a separate input button.

In various other embodiments, the gaming system is configured to combine a set of notes into a single button press. For example, the music sheet can include a C Major chord with 3 notes, but the display device can inform the player to press the right most button on the button panel.

In various embodiments, the gaming system is configured to replace the music the gaming system plays such that the sheet music is silent, and the gaming system plays the music played by the player.

In various embodiments, the gaming system is configured to output the players music along with the audio the gaming system outputs for the sheet music. In various such embodiments, the gaming system can produce such audio with the instrument that the player uses such that the audio produced by the player's instrument replaces that instrument.

In various embodiments, the gaming system is configured to output the player's notes (whether correct or not) along with the correct notes for the sheet music.

In various embodiments, the gaming system is configured to output the notes correctly or nearly correctly to extend the reel spin time. For example, the reels might spin for 3 seconds and stop at randomly determined positions, but when the player is hitting all the notes correctly, the reels spin longer or continue to spin until the player makes a mistake.

In various embodiments, the gaming system is configured to enable the player of the music to stop the reels by stopping to play the instrument. In certain such embodiments, the reel stop positions are randomly determined. In other embodiments, the player's action can partly or fully control the stop positions of the reels (and thus this can be provided at least a partial skill game). For example, in various embodiments, the gaming system is configured to enable the player to play the notes correctly for 3 seconds and the player can then stop playing where the player wants to try and land on a symbol. In various embodiments, this can be provided in a secondary game or for a social game.

In various embodiments, the gaming system is configured to provide a tournament (such as buy in tournament or a real money tournament). In the tournament, the gaming systems enable the players to attempt to play the sheet music with the most accuracy over a period of time or determined quantity of games. In various embodiments, the gaming system is configured to provide a leaderboard tracking which players are playing the music with the most accuracy. In various embodiments, the gaming system is configured to select a winner at the end of the tournament based on how well the players played the music and/or the outcome of the reel games that occur during the tournament. For example, 50% of the tournament can be based on the play of the sheet music by the player and 50% can be based on the amounts won from the plays of the reel game of the tournament.

In various embodiments, the gaming system is configured to display the sheet music as guitar tablature (a.k.a., "guitar tab"), which is another form of sheet music but for guitar players.

Figure 2R:
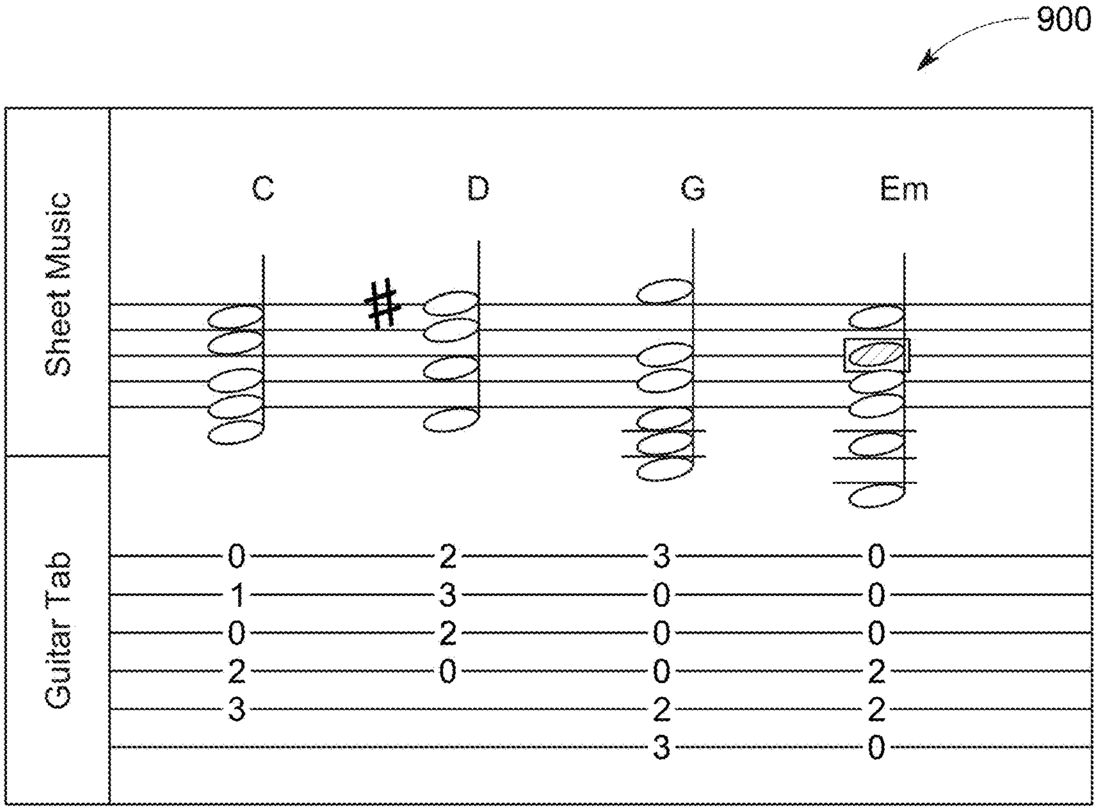
FIG. 2R shows an example of guitar tab sheet music usable by a gaming system in accordance with another example embodiment of the present disclosure.

FIG. 2R shows an example of guitar tab sheet music 900 that can be displayed by a gaming system of the present disclosure. The top section is more in the form of sheet music described above and the bottom section (with the numbers) is the guitar tab for the exact same 4 chords. The guitar tab shows the strings of the guitar and which guitar fret to play for each note. Guitar tab is more common for guitar players and may be somewhat easier to read for many players. The present disclosure provides that such guitar tab showing the string can be a form of the sheet music displayed by the gaming system of the present disclosure.

It should be appreciated from the above that various embodiments of the present disclosure provide a gaming system configured to: (1) display sheet music and a component of the sheet music, (2) display an indication of a mapping of the component of the sheet music onto a reel, and (3) display an indication of a player input associated with the component of the sheet music. In various such embodiments, the gaming system is further configured to display an input button associated with the component of the sheet music. In various such embodiments, the gaming system is further configured to display an instrument associated with the component of the sheet music, and wherein the player input is associated with the display of the instrument. In various such embodiments, the gaming system is further configured to display an instrument associated with the component of the sheet music. In various such embodiments, the gaming system is further configured to receive a signal representing the player input from a real musical instrument. In various such embodiments, the gaming system is further configured to receive a signal representing the player input from a toy musical instrument. In various such embodiments, the gaming system is further configured to receive a signal from a microphone based on the player input from a musical instrument. In various such embodiments, the gaming system is further configured to display an indication of an accuracy of the player input relative to the component. In various such embodiments, the gaming system is further configured to display an indication of an award at least partially associated with the accuracy of the player input relative to the component. In various such embodiments, the component of the sheet music is a note, and the accuracy is based on whether the player input corresponds to the note. In various such embodiments, the component of the sheet music is a note, and the accuracy is based on whether the player input corresponds a timing of the note. In various such embodiments, the gaming system is further configured to display an outcome associated with the reel without regard to the player input associated with the component. In various such embodiments, the gaming system is further configured to display an indication of an accuracy of the player input relative to the component in comparison to another player.

It should further be appreciated from the above that various embodiments of the present disclosure provide a gaming system configured to: (1) display sheet music and a plurality of components of the sheet music, (2) display indications of mappings of the plurality of component of the sheet music onto reels, (3) display an indication of an accuracy of player inputs associated with the plurality of components of the sheet music, and (4) display an indication of a first paytable from of a plurality of different paytables based on the accuracy of the player inputs associated with the plurality of components of the sheet music. In various such embodiments, the gaming system is further configured to select the first paytable such that an average expected payback percentage of the first paytable directly corresponds to a percentage of the accuracy. In various such embodiments, the plurality of different paytables each have a same average expected value.

It should further be appreciated from the above that various embodiments of the present disclosure provide a gaming system configured to: (1) display sheet music and a plurality of components of the sheet music, (2) cause an audio output corresponding to the plurality of components of the sheet music, (3) display indications of mappings of the plurality of components of the sheet music onto reels, and (4) cause an audio output corresponding to a plurality of player inputs related to the plurality of components of the sheet music. In various such embodiments, the gaming system is further configured to cause the audio output corresponding to the plurality of player inputs related to the plurality of components of the sheet music in place of an audio related to an instrument for the sheet music. In various such embodiments, the gaming system is further configured to determine a characteristic of a spin of one of the reels based on the plurality of player inputs related to the plurality of components of the sheet music. In various such embodiments, the gaming system is further configured to cause the reels to stop spinning responsive to a stopping of receipt of player inputs related to the plurality of components of the sheet music.

Sheet Music Employed in Central Determination Systems

Various embodiments of the present disclosure provide employing sheet music in or in conjunction with central determination gaming systems.

Various central determination gaming systems are configured such that the awards for the plays of the games thereof are not random, but are rather pre-determined. In various such embodiments, the outcome (such as the symbols displayed) for the play of the game is determined based on the pre-determined award.

Various central determination gaming systems are configured such that the awards for the plays of the games thereof are not purely random, but rather are partially randomly determined and partially player determined. In various such embodiments, the outcome (such as the symbols displayed) for the play of the game is determined based partly based on the pre-determined award and partly based on player input.

Various central determination gaming systems are configured such that the awards for the plays of the games thereof are completely player determined. In various such embodiments, the outcome (such as the symbols displayed) for the play of the game is determined based at least in part on player input.

These different central determination gaming systems are well known in the gaming industry and are thus not described herein for brevity.

Various central determination gaming systems thus are configured such that the awards for the plays of the games thereof are not solely random due to various jurisdictional requirements. For various such central determination gaming systems, the outcomes of the plays of the games thereof can be actually, partially, or additionally determined by one or more sheet music related inputs by the player.

The following provides different example embodiments of how player inputs related to sheet music displayed by a gaming system can be employed in different manners to at least partially determine the outcome and any related awards for a play of a game.

In one example embodiment, the central determination gaming system has two different paytables that both have a payback percentage of 95%, but in two different ways. For example, paytable A pays 500 for 4 cherries, while paytable B does not. In one such embodiment, the gaming system monitors how many notes the player got correct. If the number is odd, the gaming system uses paytable A and if the number is even the gaming system uses paytable B. This effectively provides player influence over the outcomes of the plays of the game. In one such example, where the player activates input devices on the button panel to play the notes, (a) if the player gets 47 notes of the 50 notes displayed shown correct, since 47 is an odd number, the gaming system evaluates the reel symbols using paytable A; and (b) if the player gets 46 notes of the 50 notes displayed shown correct, since 46 is an even number, the gaming system evaluates the reel symbols using paytable B.

In various embodiments, the gaming system can indicate the different paytables and the selection of one of the paytables. In various embodiments, the gaming system can hide the selection of the different paytables from the player.

In various embodiments, the gaming system does not enable the player to make inputs corresponding to the notes (or chords), but rather enables the player to make one or more different inputs regarding the sheet music. For example, in various embodiments, the gaming system enables the player to pick a quantity of notes or a range of quantities of notes. When the player chooses correctly, the gaming system provides the player a feature or an award.

In various other embodiments, the gaming system selects the paytable based on the player's inputs (such as correctly making such an input). In such embodiments, the paytables can be similar and thus the player inputs can have minimum effects on the outcomes of the plays of the game that include the display of the sheet music.

In various other embodiments, the outcomes of the plays of the game are partially determined by the timing of the notes played by the player. For example, the random number generator can be cycled (i.e., number removed from the random sequence) with each note played (correctly and/or incorrectly). Thus, the player is changing the random values chosen by the gaming system for the play of the game.

In various other embodiments, the gaming system is configured such that the player's inputs can affect when the reels stop on a set of notes, and those notes can be used to pick the paytable used by the gaming system. In this manner, after the reels stop, the paytable can change, thus making the player's choice an input into the outcome for the play of the game (or a future play of the game). In various embodiments, this is combined with the requirement of the player to stop the reels such that the player is effectively having input on which paytable is used with each button press to stop the reels.

In various other embodiments, the gaming system is configured to enable the player to stop the reels at a reel stop position that corresponds to (such as matches) one or more notes or chords. The gaming system is configured to enable the player to use the button panel or touch screen to pick one or more notes or the chord displayed. If the player makes a correct selection, the gaming system provides an evaluation of the reel symbols, or an extra evaluation, or an evaluation with a better paytable. If the player does make a correct selection, the gaming system does not provide an evaluation or does not provide an extra or enhanced evaluation. For example, the gaming system can display via its display device display buttons for "C," "D," G" or "E" and can stop the sheet music to display the C chord (notes including the C major chord). The gaming system enables the player to select the chord using the input buttons. In another embodiment, the gaming system enables the player to select the chord or notes before the reels stop. For example, the gaming system enables the player to choose "C," and if the gaming system stops the reels on a winning symbol that includes a "C" note, the gaming system provides an award for the player. If the reels do not stop on a winning combination with the "C" note, the player does not win or wins a lower amount.

Figure 2S:
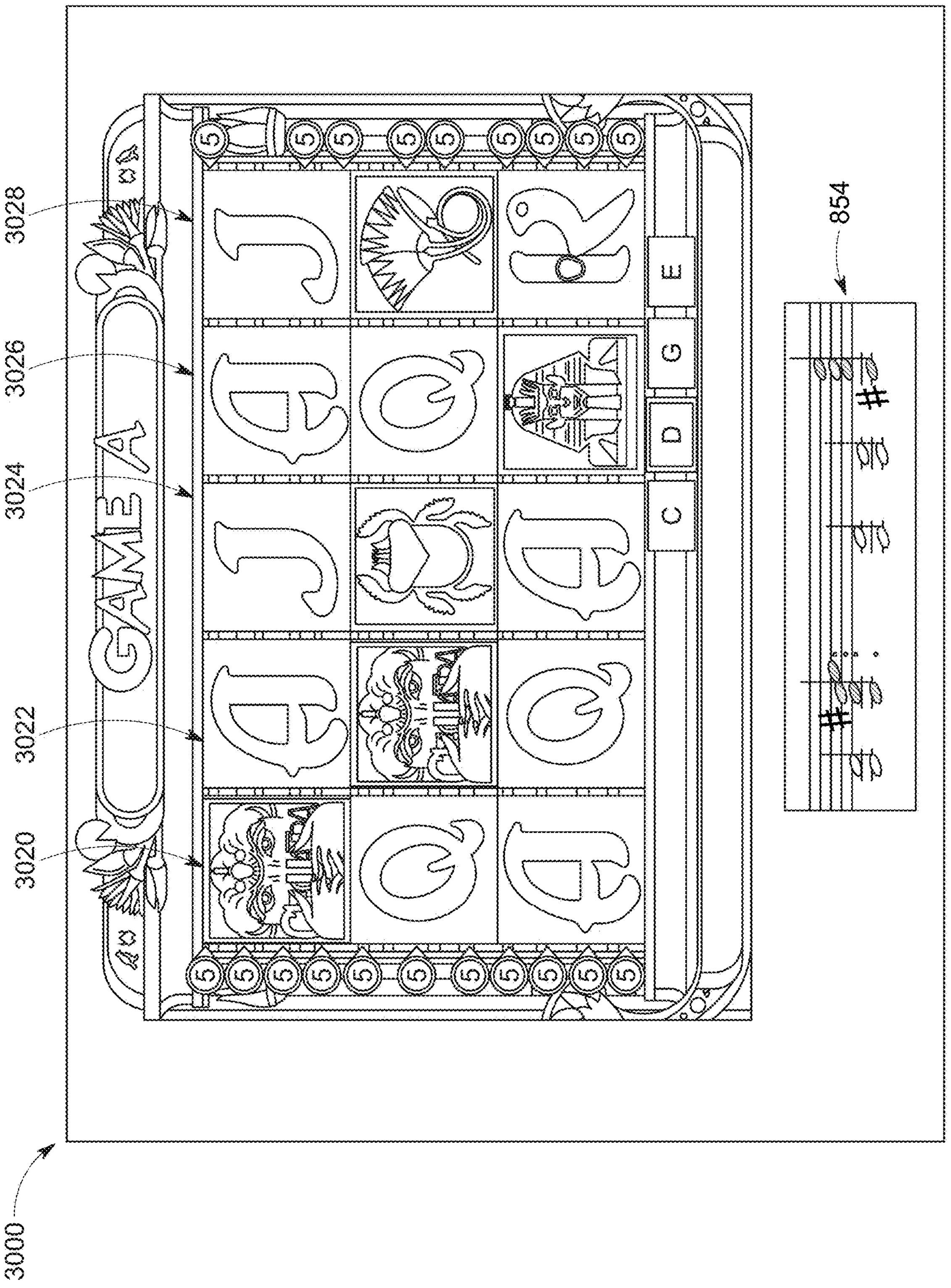
FIG. 2S is an example screen display by a display device of a gaming system that shows an example set of reels and sheet music for drums and input buttons for the player to make inputs to play notes of the sheet music in accordance with one example embodiment of the present disclosure.

FIG. 2S shows a display device 3000 of a gaming system displaying a set of five reels 3020, 3022, 3024, 3026, and 3028 and the sheet music below the reels. The display device 3000 also displays the input buttons of "C", "D", "G" or "E" that correspond to notes of the sheet music. When a player selects one of the notes, the display device 300 can display an indication of that selection (such as the extra box around the player selected D button). In other embodiments, the gaming system enables the player to choose more than one note or chord (such as 2 notes or chords). In other embodiments, the gaming system provides the selection as a game feature that enables the player to win the ability to choose a second, third, etc. note.

In various embodiments, this ability is limited in time (such as 60 seconds) or in play (good for 5 spins), or until a win or loss happens. This ability can be won from primary game play or secondary game play.

In various other embodiments, when the reels stop the player must correctly enter the notes/chords into the button panel. For example, the game stops on notes "G" and "E." The player must press the button corresponding to "G" and "E" to receive the award. In these embodiments, the player does not need to know how to read sheet music, and in certain such embodiments, the gaming system displays indicators of the notes (such as display a "G" and "E"), and enables the player to use buttons or the user interface to match the correct notes to win in the game symbol evaluation. In various such embodiments, the gaming system enables the player to identify the chords such that "C" would cover C major, C minor, Csus2, etc. (i.e., the player is indicating the "C" family of chords with a single UI selection).

Figure 2T:
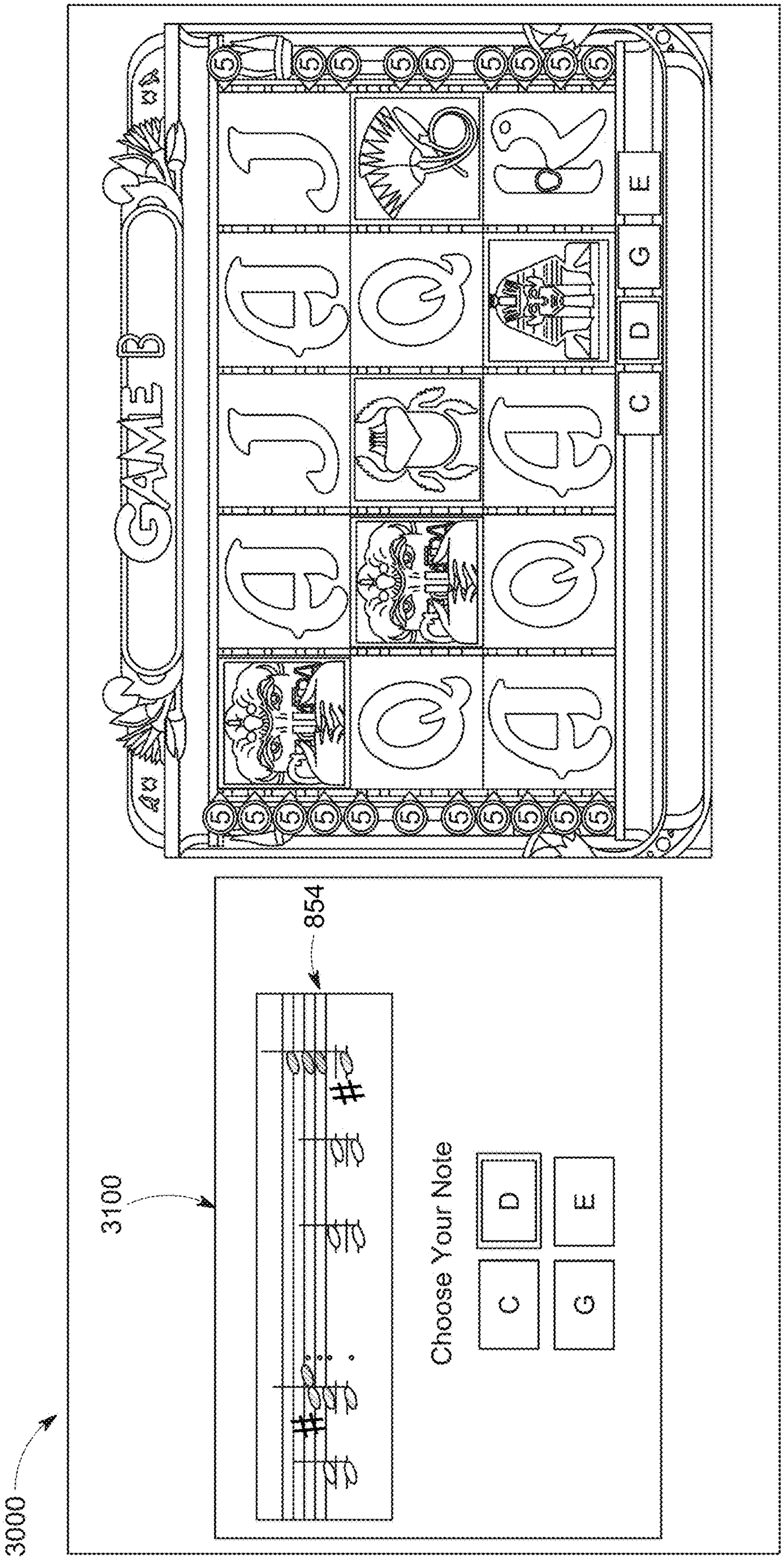
FIG. 2T is an example screen display by a display device of a gaming system that show an example set of reels and an example service window adjacent the reels, wherein the service window displays the sheet music for drums and input buttons for the player to make inputs for via the service window to play notes of the sheet music in accordance with one example embodiment of the present disclosure.

In various embodiments, one or more of the player selection features such as the player note selection feature can be provided by the gaming system via a service window or mobile application. FIG. 2T shows one example of how the gaming system can enable a player to choose the note(s) via a service window 3100.

In various other embodiments, the player input regarding the music sheet alters the random number generator (RNG) or random number generation. For example, the gaming system can choose random values using the RNG for a play of a game, and the gaming system can employ the player input(s) regarding the sheet music to determine one or more additional values to modify one or more of the random values used for the play of the game.

In various embodiments, as the reels spin and the player selects a note, a chord, or timing correctly while playing along with the sheet music, the gaming system can select an RNG value or modification of an RNG value in different embodiment. For example, as the notes go by on the reel, the player can make inputs via the button panel and can get the notes correct or incorrect. When the player chooses correctly, the gaming system queries the RNG for a value (and does not use it for any purpose). In this manner, the player input affects which RNG values will be chosen at the time of actual game evaluation. Alternatively, the gaming system can determine the quantity of correct (or incorrect) choices, and select the RNG values all at once right before the evaluation. The correct (or incorrect) player input cause the gaming system to retrieve a number from the RNG. If the RNG is a pseudo RNG that provides a sequence of numbers, this effectively changes the RNG timing. For example, if the RNG sequence is 5, 10, 15, 20, when the gaming system evaluates, it receives the numbers 5, 10, and 15 for a 3 reel slot outcome and maps 5, 10, 15 to reel stops and symbols, and then does the evaluation. When the player gets the notes correct, the gaming system retrieves different numbers from the RNG sequence. For example, the gaming system receives the numbers 10, 15, and 20. This results in a different outcome, and thus the player input has affected the outcome. Some markets have a requirement that no games of chance are allowed, and some player influence must be present. This example gaming system can facilitate the required player influence over game outcomes in those markets.

In various other embodiments, the gaming system selects which of a plurality of RNGs or different RNGs is used by the gaming system for a play of a game based on an input associated with the sheet music. For example, the gaming system can have two different RNGs, and when the player makes an odd number of correct selections regarding the sheet music, the gaming system employs a first one of the RNGs, and when the player made an even number of correct selections regarding the sheet music, the gaming system employs the second one of the RNGs.

In various other embodiments, the note selection of the sheet music by the player (such as choosing "C", "D", "G", or "E") determines which RNG the gaming system employs for a play of a game (e.g., the selection of "C" causes the gaming system to use a first RNG, and the selection of "D" causes the gaming system to use a second RNG, etc.).

In various embodiments, the gaming system can randomly or periodically award the player for selecting correct notes or timing based on the displayed sheet music.

In various embodiments, the gaming system can randomly or periodically deduct money from an award if the play does not select correct notes or timing based on the displayed sheet music.

Figure 2U:
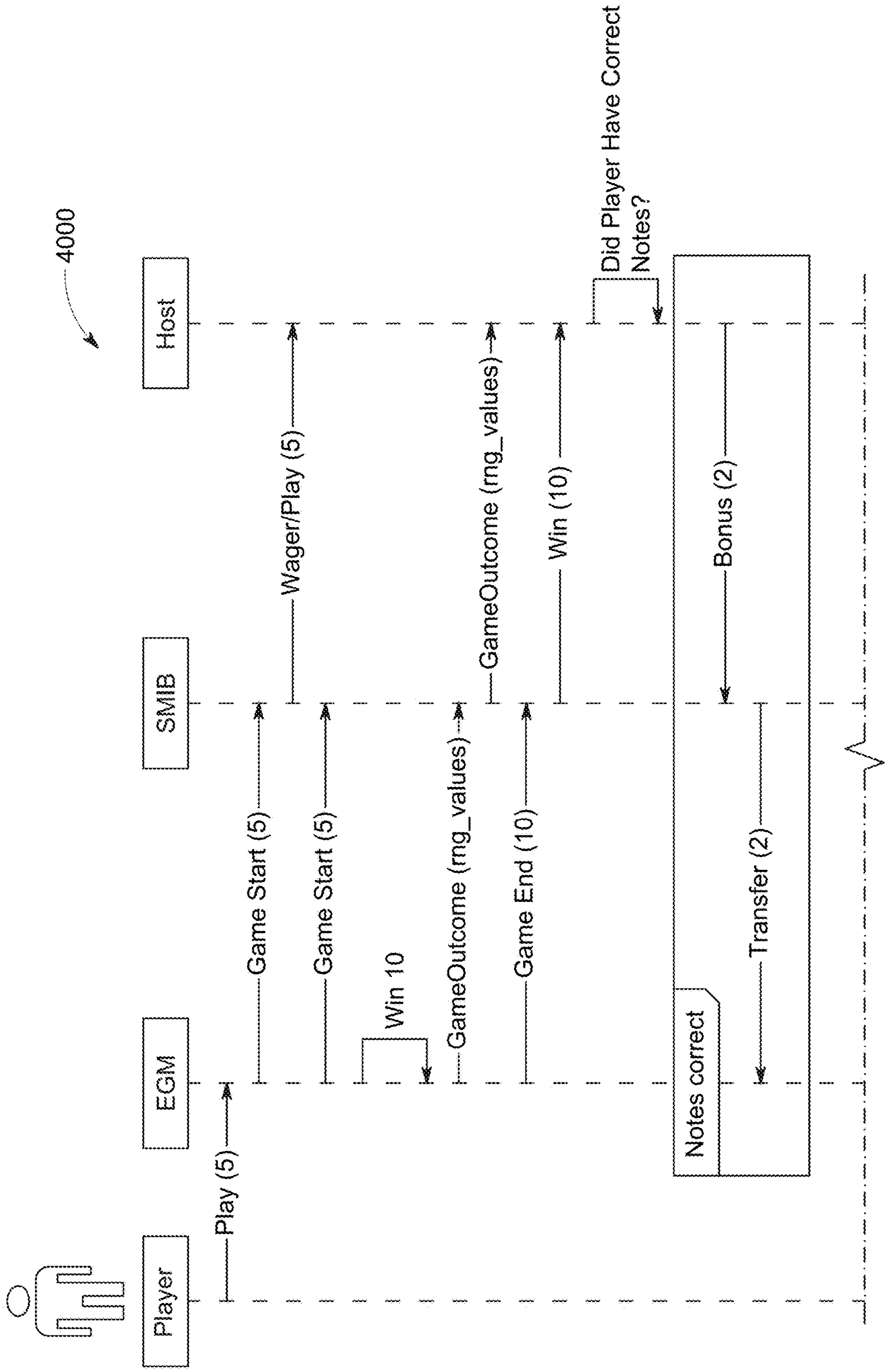
FIG. 2U is a flow chart of a method of operating a gaming system of one example embodiment of the present disclosure.

FIG. 2U shows a sample flow chart of a method 4000 of operating a gaming system of one example embodiment of the present disclosure. In this example embodiment, the host determines how many of the player's notes are correct and provides an award based on that determination. More specifically, in one such example, the EGM enables the player to wager 5 units (such as credits or dollars) at the EGM. The EGM starts the play of the game including the display of the sheet music. The host determines which notes were included in the outcome of the play of the game such as via a random determination values. The host can know which notes those random values would produce for the current game. The host receives the signals representing the player's note selection (s) via the service window and determines to provide the player 2 additional units for selecting the correct notes. In this example embodiment, the SMIB can notify the host when the game and paytable changes so that the host can know which paytable the game is using. Using this paytable and the RNG values, the host can look up in a file or database which reel outcomes (i.e., symbols on the reels) correspond to each RNG outcome and therefore the host knows the music notes the player received.

In various embodiments, the host can be notified when the player changed the current game and can then use a database of the paytable for that game and employment of the random values. If the player chooses to player Game A, the SMIB (or EGM) informs the host "now playing game A". The host can then search its database for game A and learn the paytable, rules and random number mappings for game A.

It should be appreciated from the above that various embodiments of the present disclosure provide a gaming system configured to: (1) display sheet music and a component of the sheet music, (2) display an indication of a mapping of the component of the sheet music onto a reel, (3) display an indication of a player input associated with the component of the sheet music, and (4) display an indication of an outcome based on the mapping of the component of the sheet music onto the reel and the player input. In various such embodiments, the component of the sheet music is a note. In various such embodiments, the gaming system is further configured to display device a symbol on the reel that corresponds to the note. In various such embodiments, the gaming system is further configured to determine the outcome based on a selected first paytable from a plurality of different paytables, wherein the selected first paytable is based on the player input. In various such embodiments, the gaming system is further configured to: (1) display a plurality of different components of the sheet music, and display indications of mappings of the plurality of components of the sheet music onto a plurality of reels including the reel, wherein the indication of the player input is associated with the plurality of components, and wherein the indication of the outcome is based on the mapping of the plurality of the components onto the reels and the player input. In various such embodiments, the player input corresponds to one of: a quantity of the components and a range of quantities of the components. In various such embodiments, the gaming system is further configured to cause the player input to affect a random number generation for determining the outcome. In various such embodiments, the gaming system is further configured to cause the player input to affect a cycling of a random number generator for determining the outcome. In various such embodiments, the gaming system is further configured to cause the player input to cause a change to a random number generated for determining the outcome.

It should further be appreciated from the above that various embodiments of the present disclosure provide a gaming system configured to: (1) display sheet music and a plurality of different notes of the sheet music, (2) display indications of mappings of the notes of the sheet music onto reels, (3) display indications of player inputs associated with the notes of the sheet music, and (4) display an indication of an outcome based on the mapping of the notes of the sheet music onto the reels and the player inputs. In various such embodiments, the gaming system is further configured to determine the outcome based on a selected first paytable from a plurality of different paytables, wherein the selected first paytable is based on the player inputs. In various such embodiments, the gaming system is further configured to determine the outcome based on a selected first paytable from a plurality of different paytables, wherein the selected first paytable is based on a quantity of the player inputs that correctly correspond to the notes. In various such embodiments, the gaming system is further configured to display an indication of the selected first paytable based on the quantity of the player inputs that correctly correspond to the notes. In various such embodiments, the gaming system is further configured to determine the outcome based in part on timing of the player inputs relative to the notes.

It should further be appreciated from the above that various embodiments of the present disclosure provide a gaming system configured to: (1) display sheet music and a plurality of different notes of the sheet music, (2) display an indication of at least one player input associated with notes of the sheet music, such that the at least one player input causes a selection of the plurality of the different notes, (3) display indications of mappings of the plurality of notes of the sheet music onto reels, and (4) display an indication of an outcome based on the mapping of the plurality of notes of the sheet music onto the reels. In various such embodiments, the gaming system is further configured to display a plurality of indications of player inputs associated with notes of the sheet music, such that the player inputs cause the selection of the plurality of the different notes. In various such embodiments, the gaming system is further configured to select one of a plurality of different paytables based on the plurality of notes. In various such embodiments, the gaming system is further configured to display reel symbols on the reels corresponding to the plurality of notes. In various such embodiments, the gaming system is further configured to, based on the plurality of notes, display an award amount greater than zero associated with the plurality of notes. In various such embodiments, the gaming system is further configured to, based on the plurality of notes, display an award amount of zero associated with the plurality of notes.

Direct Use of Sheet Music for Symbol Determination

In various embodiments described above, the sheet music and particularly a selected section of the sheet music (such as a gaming system randomly selected section of the sheet music) is used to determine the notes for a play of a game, the notes are mapped to symbols for reels, the gaming system displays the symbols on the reels as the outcome for the play of the game, and the gaming system determines any awards based on those displayed symbols.

In various other embodiments, the gaming system does not display reels, but rather directly uses the sheet music to determine the symbols for a play of a game. In various such embodiments, the gaming system displays one or more indicators associated with the sheet music (such as one or more moving widow indicators).

In various embodiments, the gaming system can enable the player to select the player's preference such that the player can decide how they want the game displayed (such as more in a traditional reel form or more in a pure sheet music form).

Figure 2V:
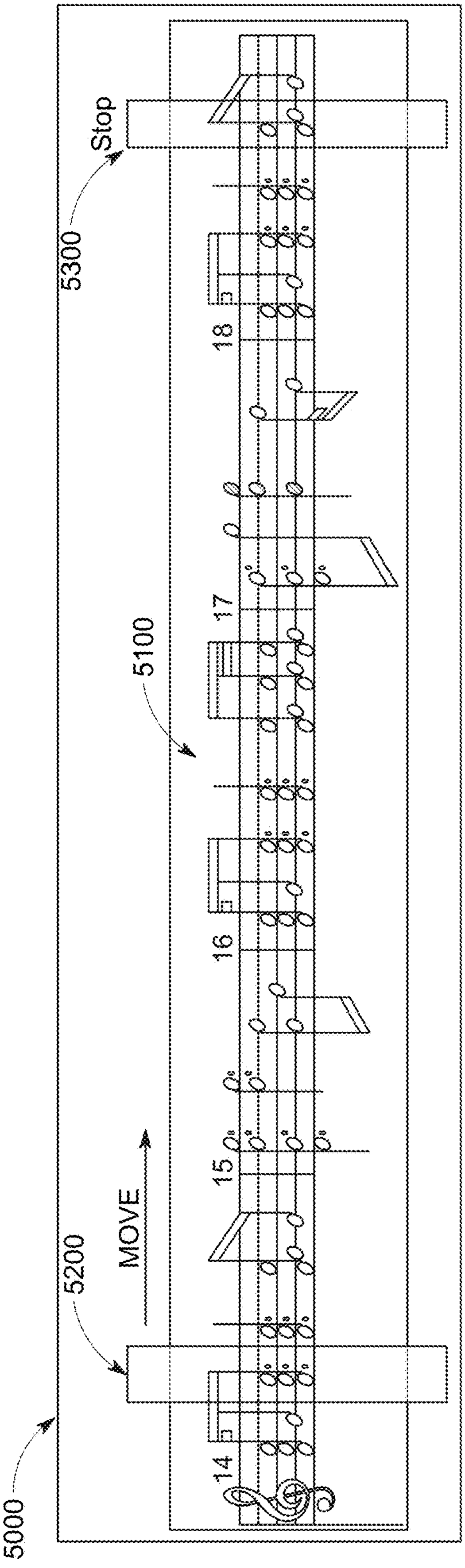
FIGS. 2V and 2W are example screen displays by a display device of a gaming system that show part of an example play of a game using sheet music with a relatively narrow note indicator to generate and display symbols for the play of the game in accordance with one example embodiment of the present disclosure.

FIG. 2V shows an example display by a display device 5000 of a gaming system showing a part of a play of a game using sheet music 7500 with a relatively narrow note indicator. In this example embodiment, the note indicator is configured to move from a first position indicated by note indicating window 5200 to a second position indicated by note indicating window 5300. It should be appreciated that other indicators can be employed to indicate the notes besides theses rectangular window(s) (such as but not limited to different lighting, different colors, and stationary or moving pointers). FIG. 2V shows that during a play of the game, a display device can display the indicator at a first position (window 5200 in this example) moving to a second position (window 5300 in this example) to select the notes from the sheet music 5100 that will be used for determining the outcome of the play of the game including the generated and displayed symbols that will be evaluated for the play of the game. In this example, the notes within the window 5300 will be used for such symbol generation. In this embodiment, the window 5300 is relatively narrow and thus provides for multiple notes for a single set of generated symbols of the game.

Figure 2W:
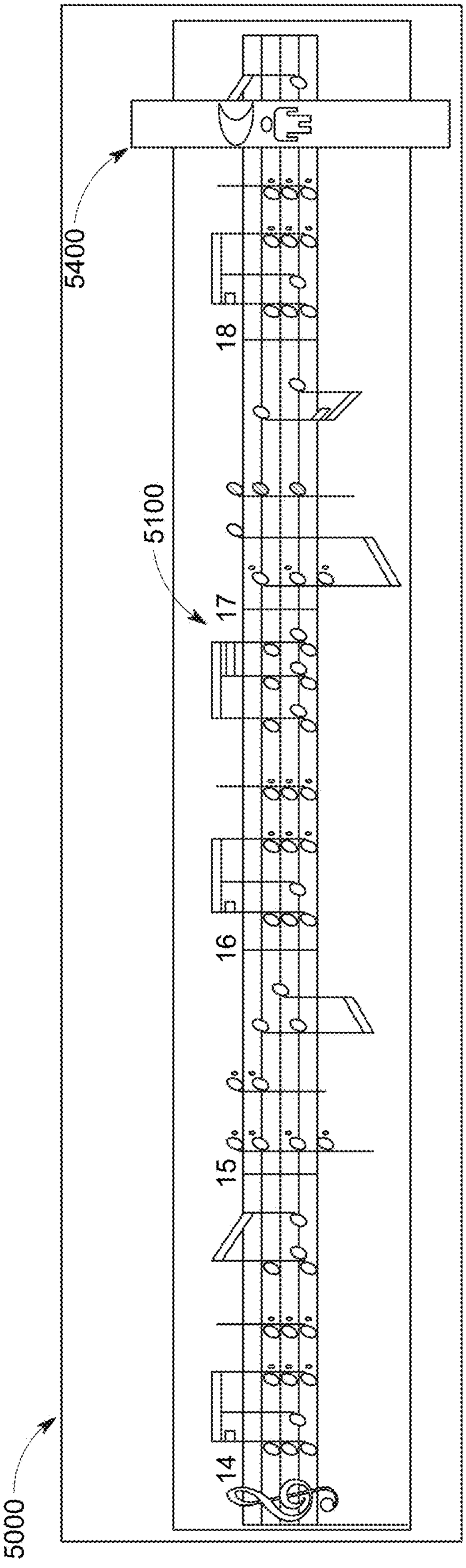

FIG. 2W shows a display by a display device 5000 of a gaming system showing a part of the play of the game using sheet music 5100 wherein after the indicator stops moving relative to the sheet music 5100, the gaming system causes the display device to display a converted window 5400 that displays the symbols that correspond to the notes displayed in window 5300. In this example, the notes correspond to the diagonal moon and the person symbols that can be evaluated for any awards. This example shows how the sheet music can be used to directly determine the symbols of a play of a game (instead of being mapped to reels). In various embodiments, the other symbols of the game can be generated in any other suitable manner. In various embodiments, the other symbols of the game can be generated based on other sheet music. In various embodiments, the other symbols of the game can be generated based on other indicators on the sheet music 5100.

Figure 2X:
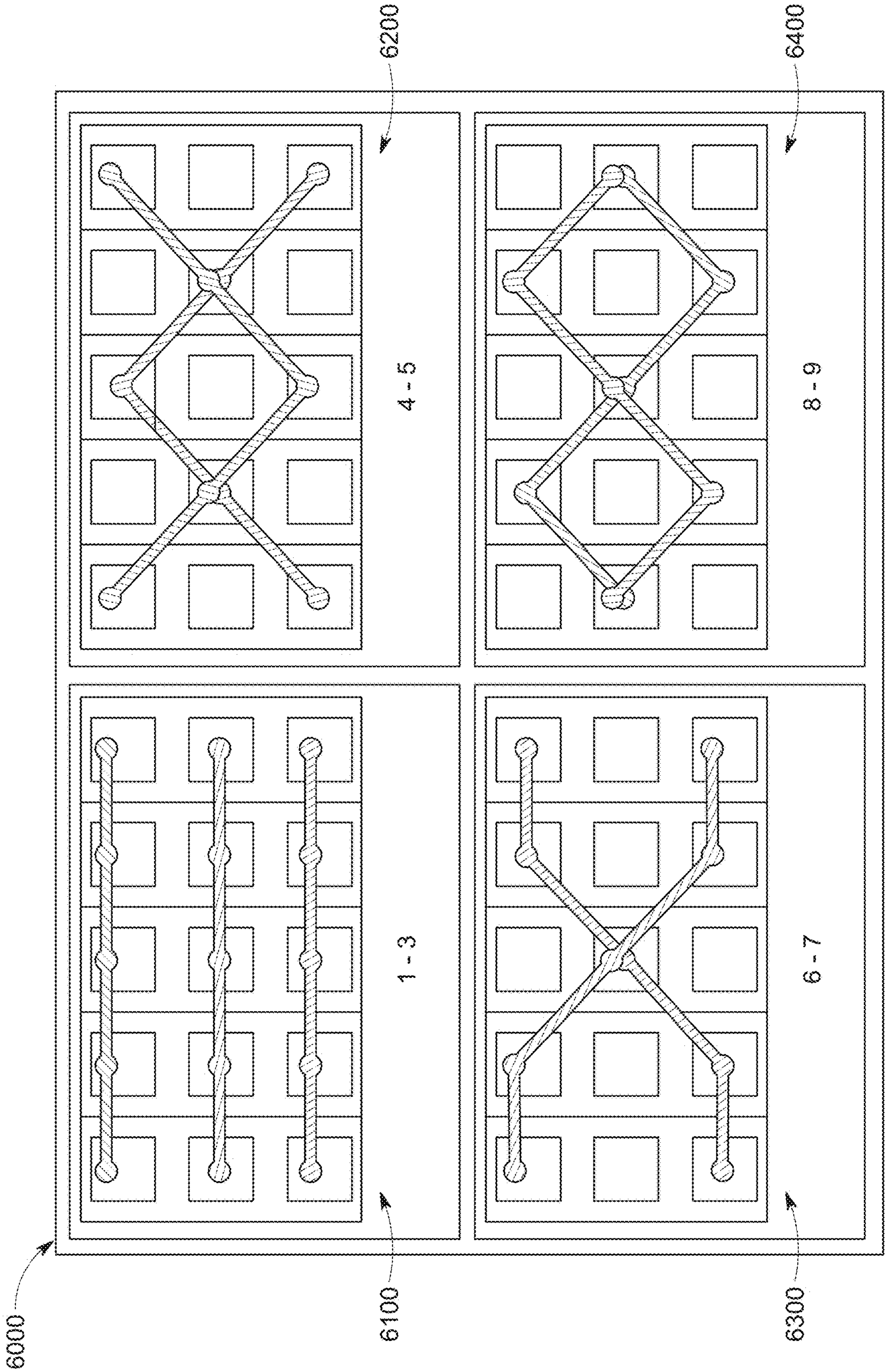
FIG. 2X shows example screen displays by a display device of a gaming system that include different example paylines that can be associated with symbol display positions at which symbols for a play of a game can be generated and displayed based on sheet music in accordance with one example embodiment of the present disclosure.

FIG. 2X shows sets 6100, 6200, 6300, and 6400 of different example paylines that can be associated with symbol display positions at which the indicated notes from the sheet music can be displayed. The present disclosure contemplates any suitable paylines. The present disclosure also contemplates other symbol evaluation methods (such as but not limited to ways to wins symbol evaluation methods).

Figure 2Y:
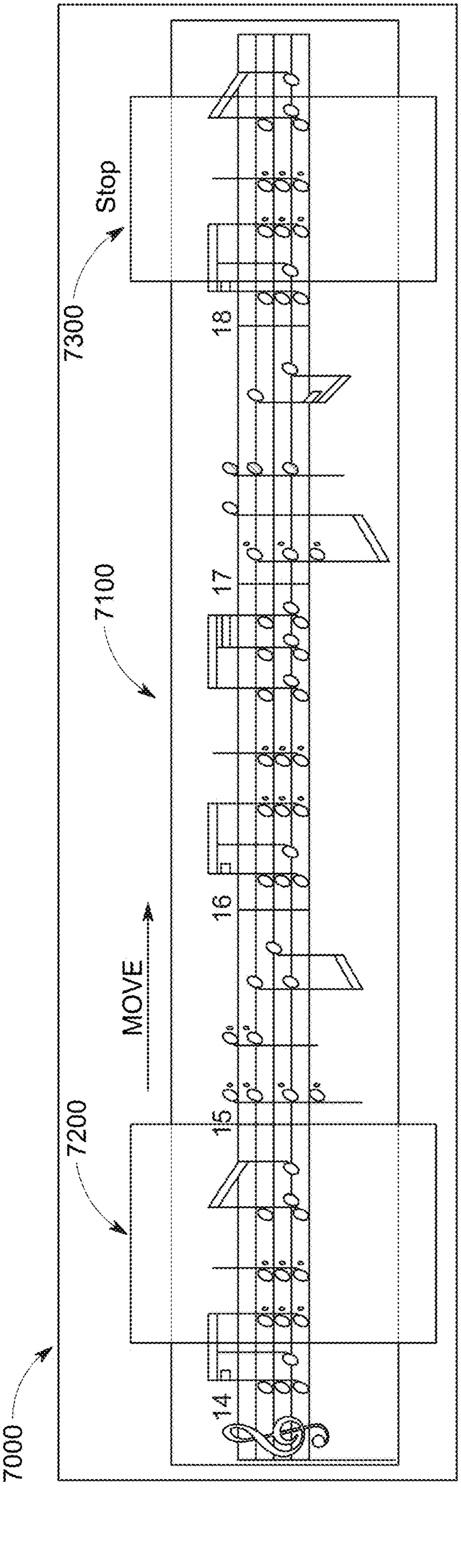
FIGS. 2Y and 2Z are example screen displays by a display device of a gaming system that shows part of an example play of a game using sheet music with a relatively wide note indicator to generate and display symbols of the play of the game in accordance with one example embodiment of the present disclosure.

FIG. 2Y shows a display by a display device 7000 of a gaming system of a part of a play of a game using sheet music 7100 with a relatively wide note indicator. In this example embodiment, the note indicator is configured to move from a first position indicated by note indicating window 7200 to a second position indicated by note indicating window 7300. It should be appreciated that other indicators can be employed to indicate the notes besides the window(s) (such as but not limited to different lighting, different colors, and stationary or moving pointers). FIG. 2Y shows that during a play of the game, a display device can display the indicator at a first position (window 7200 in this example) then moving to a second position (window 7300 in this example) to select the notes from the sheet music 7100 that will be used for the outcome of the play of the game including the generated and displayed symbols that will be evaluated for the play of the game. In this example, the notes within the window 7300 are used for such symbol generation. In this embodiment, the window 7300 is relatively wide and thus provided for multiple notes and enables multiple paylines to be associated with the game (such as the paylines shown in FIG. 2X).

Figure 2Z:
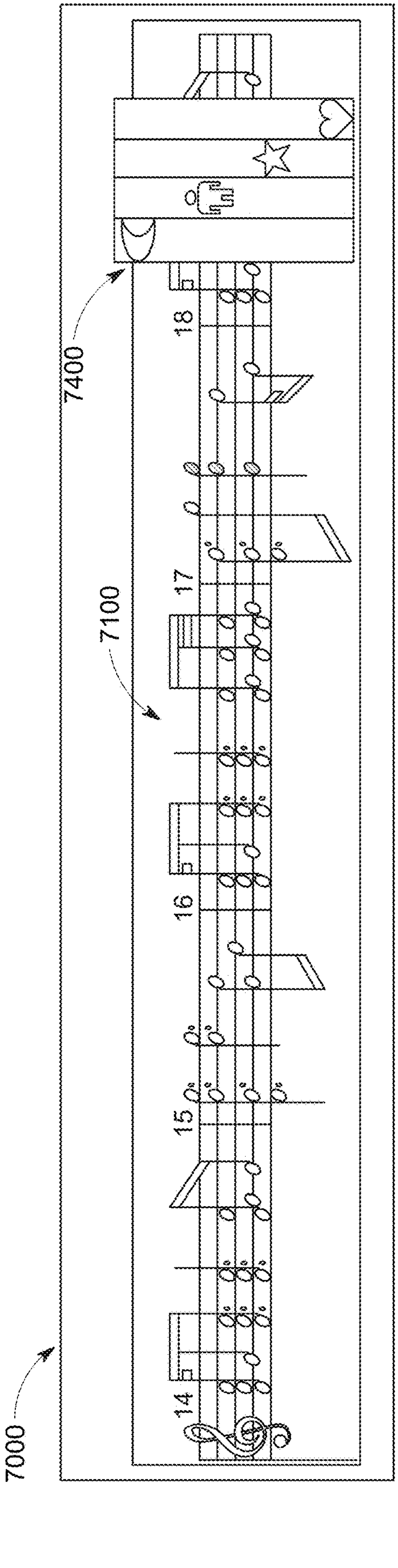

FIG. 2Z shows a display by a display device 7000 of a gaming system showing a part of the play of the game using sheet music 7100 wherein after the indicator stops moving relative to the sheet music 7100, the gaming system causes the display device to display a converted window 7400 that displays the symbols that correspond to the notes displayed in window 7300. In this example, the notes correspond to the diagonal moon symbol, the person symbol, the star symbol, and the heart symbol that can be evaluated for any awards. In this example, these symbols are on a diagonal payline (not shown) associated with sets of symbol display positions. It should be appreciated that due to the large quantity of notes on the sheet music and the relatively larger size of the window 7400, the result of a play of a game can be based completely on the notes in the window 7300.

In these example embodiments, the gaming system displays the window moving along the displayed sheet music while outputting the music of the sheet music until the window stops moving at a point along the sheet music. In various embodiments, which point that the window stops moving is randomly determined. In various embodiments, which point that the window stops moving is pre-determined (such as based on a desired pre-determined outcome and/or award amount). In various embodiments, which point that the window stops moving is determined based on a desired set of notes and/or symbols to be indicated (such as in a central determination manner).

Technical Improvements to Gaming Environments

Various embodiments of the present disclosure provide technical improvements to gaming environments in at least the following manners by providing: (1) different ways to integrate sheet music into gaming systems; (2) different ways to generate and display symbols in games based on sheet music; (3) different ways to determine game outcomes based on sheet music; (4) different ways to randomly determine game outcomes of games based on sheet music; (5) player skill functions based on sheet music displayed in associated with a game; (6) ways to create reel games using sheet music; (7) methods for displaying a reel game by using musical notes (and other musical concepts that are considered notes herein); (8) use of different sheet music component in games in different manners; (9) different methods to provide player influence over the game outcome; and (10) different methods to enable a player to choose the sheet music and thus to listen to the music of their choice wherein the sheet music in incorporated into determining game play outcomes.

In various embodiments, one or more awards provided in association with the gaming system and games disclosed herein include one or more of: a quantity of monetary credits, a quantity of non-monetary credits, a quantity of promotional credits, a quantity of player tracking points, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps, such as a free dinner, a free night's stay at a hotel, a high value product such as a free car, or a low value product, one or more bonus credits usable for online play, a lump sum of player tracking points or credits, a multiplier for player tracking points or credits, an increase in a membership or player tracking level, one or more coupons or promotions usable within and/or outside of the gaming establishment (e.g., a 20% off coupon for use at a convenience store), virtual goods associated with the gaming system, virtual goods not associated with the gaming system, an access code usable to unlock content on an internet.

In various embodiments, various determinations disclosed herein can be predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more servers; (b) one or more electronic gaming machines such as those located on a casino floor; and/or (c) one or more personal gaming devices. Thus, in various embodiments, the gaming system of the present disclosure includes: (a) one or more electronic gaming machines in combination with one or more servers; (b) one or more personal gaming devices in combination with one or more servers; (c) one or more personal gaming devices in combination with one or more electronic gaming machines; (d) one or more personal gaming devices, one or more electronic gaming machines, and one or more servers in combination with one another; (e) a single electronic gaming machine; (f) a plurality of electronic gaming machines in combination with one another; (g) a single personal gaming device; (h) a plurality of personal gaming devices in combination with one another; (i) a single server; and/or (j) a plurality of servers in combination with one another. For brevity and clarity and unless specifically stated otherwise, "EGM" as used herein represents one EGM or a plurality of EGMs, "personal gaming device" as used herein represents one personal gaming device or a plurality of personal gaming devices, and "server" as used herein represents one server or a plurality of servers.

As noted above, in various embodiments, the gaming system includes an EGM (or personal gaming device) in combination with a server. In such embodiments, the EGM (or personal gaming device) is configured to communicate with the server through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a server through a data network.

In certain embodiments in which the gaming system includes an EGM (or personal gaming device) in combination with a server, the server is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the server. The at least one processor of that EGM (or personal gaming device) is configured to execute the events, messages, or commands represented by such data or signals in conjunction with the operation of the EGM (or personal gaming device). Moreover, the at least one processor of the server is configured to transmit and receive data or signals representing events, messages, commands, or any other suitable information between the server and the EGM (or personal gaming device). The at least one processor of the server is configured to execute the events, messages, or commands represented by such data or signals in conjunction with the operation of the server. One, more than one, or each of the functions of the server may be performed by the at least one processor of the EGM (or personal gaming device). Further, one, more than one, or each of the functions of the at least one processor of the EGM (or personal gaming device) may be performed by the at least one processor of the server.

In certain such embodiments, computerized instructions for controlling any games (such as any primary or base games and/or any secondary or bonus games) displayed by the EGM (or personal gaming device) are executed by the server. In such "thin client" embodiments, the server remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the server to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a server, computerized instructions for controlling any primary or base games displayed by the EGM (or personal gaming device) are communicated from the server to the EGM (or personal gaming device) in a thick client configuration, and computerized instructions for controlling any secondary or bonus games or other functions displayed by the EGM (or personal gaming device) are executed by the server in a thin client configuration.

In certain embodiments in which the gaming system includes: (a) an EGM (or personal gaming device) configured to communicate with a server through a data network; and/or (b) a plurality of EGMs (or personal gaming devices) configured to communicate with one another through a data network, the data network is a local area network (LAN) in which the EGMs (or personal gaming devices) are located substantially proximate to one another and/or the server. In one example, the EGMs (or personal gaming devices) and the server are located in a gaming establishment or a portion of a gaming establishment.

In other embodiments in which the gaming system includes: (a) an EGM (or personal gaming device) configured to communicate with a server through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the server. For example, one or more of the EGMs (or personal gaming devices) are located: (a) in an area of a gaming establishment different from an area of the gaming establishment in which the server is located; or (b) in a gaming establishment different from the gaming establishment in which the server is located. In another example, the server is not located within a gaming establishment in which the EGMs (or personal gaming devices) are located. In certain embodiments in which the data network is a WAN, the gaming system includes a server and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a server through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the server identifies a player before enabling that player to place any wagers on any plays of any wagering games. In one example, the server identifies the player by requiring a player account of the player to be logged into via an input of a unique username and password combination assigned to the player. The server may, however, identify the player in any other suitable manner, such as by validating a player tracking identification number associated with the player; by reading a player tracking card or other smart card inserted into a card reader (as described below); by validating a unique player identification number associated with the player by the server; or by identifying the EGM (or personal gaming device), such as by identifying the MAC address or the IP address of the Internet facilitator. In various embodiments, once the server identifies the player, the server enables placement of one or more wagers on one or more plays of one or more primary or base games and/or one or more secondary or bonus games, and displays those plays via the Internet browser of the EGM (or personal gaming device).

The server and the EGM (or personal gaming device) are configured to connect to the data network or remote communications link in any suitable manner. In various embodiments, such a connection is accomplished via a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

Figure 3:
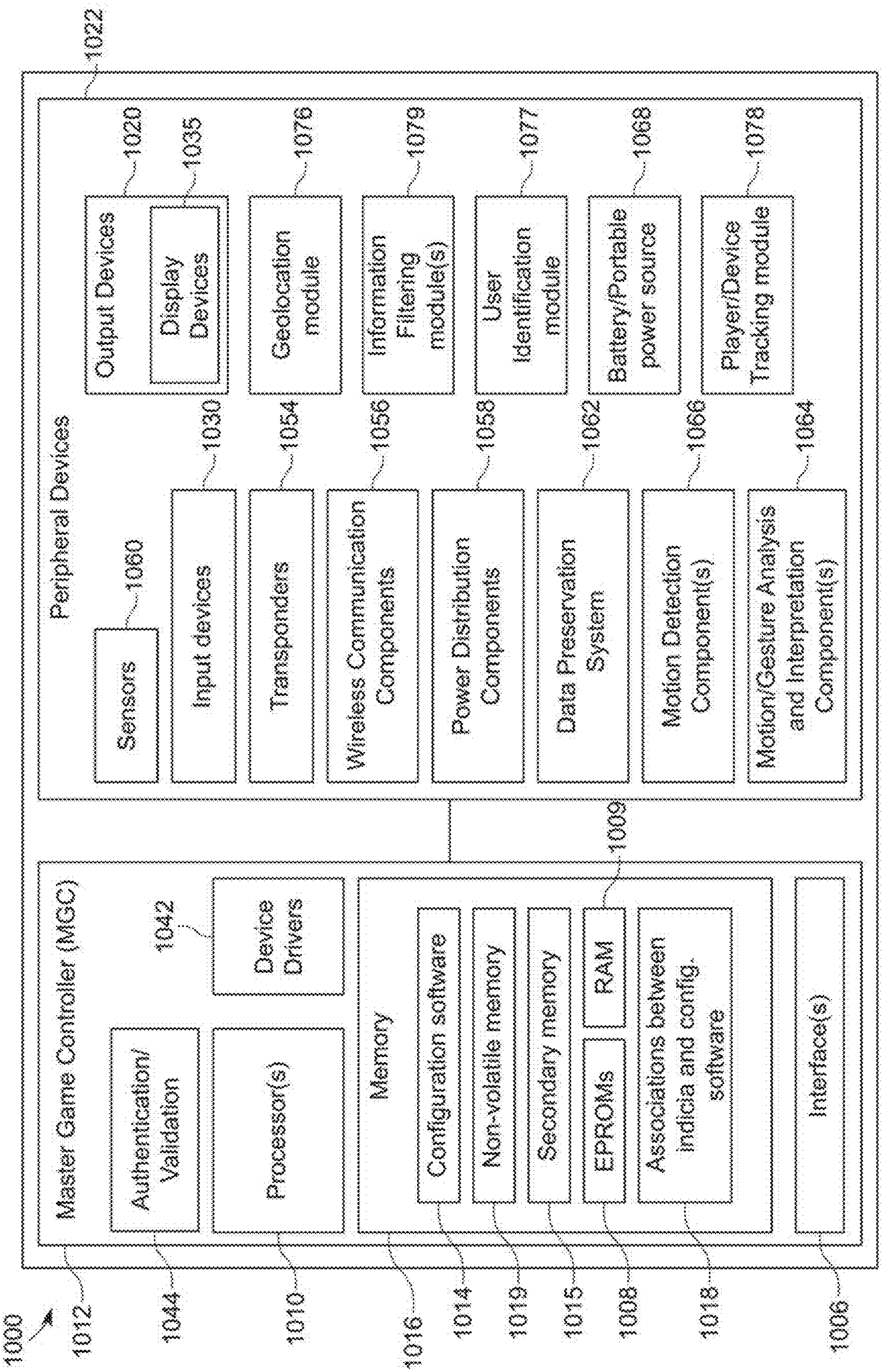
FIG. 3 is a schematic block diagram of one example embodiment of an electronic configuration of a gaming system of the present disclosure.
Figure 4A:
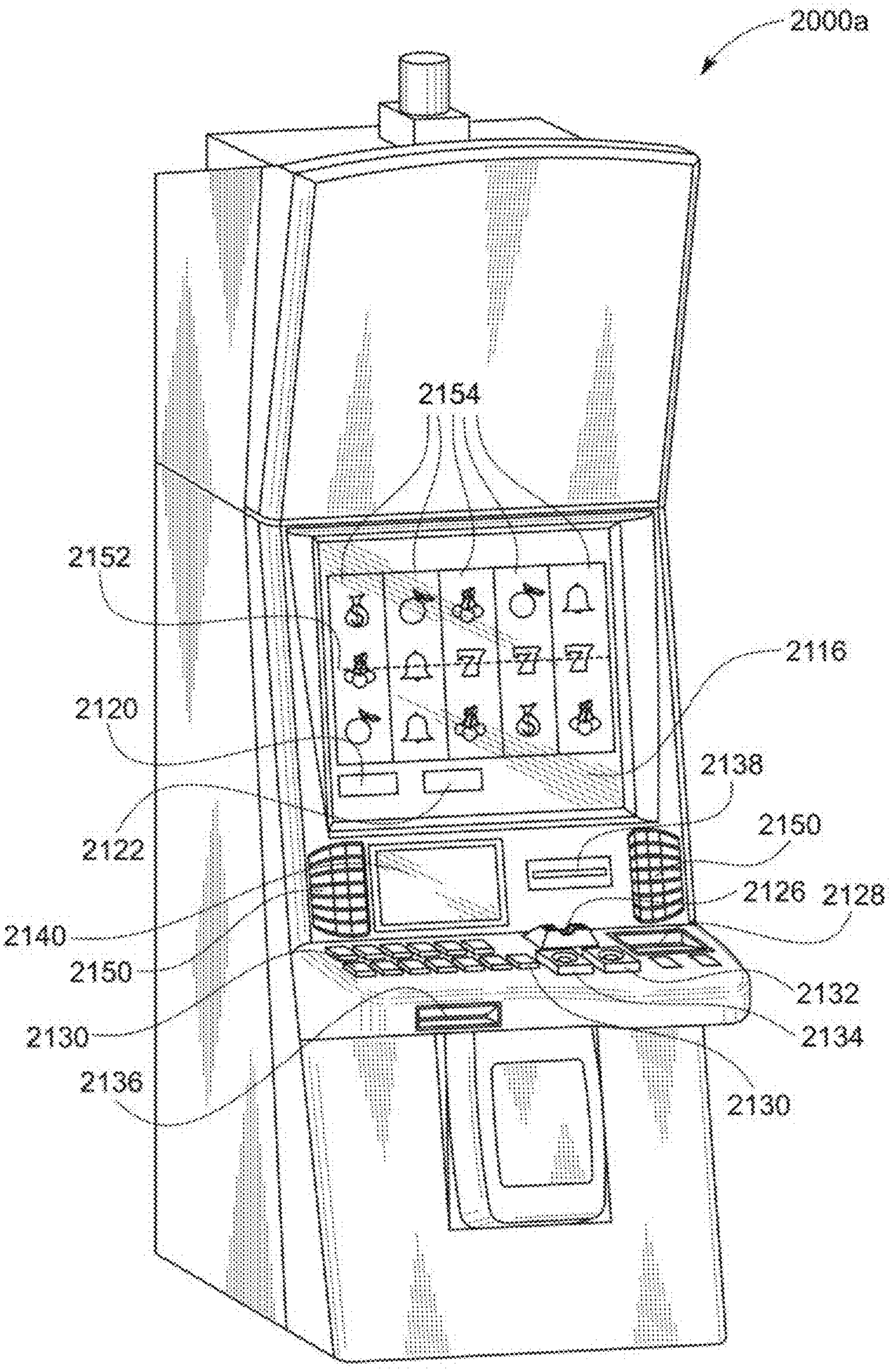
FIGS. 4A and 4B are perspective views of example alternative embodiments of the gaming system of the present disclosure.
Figure 4B:
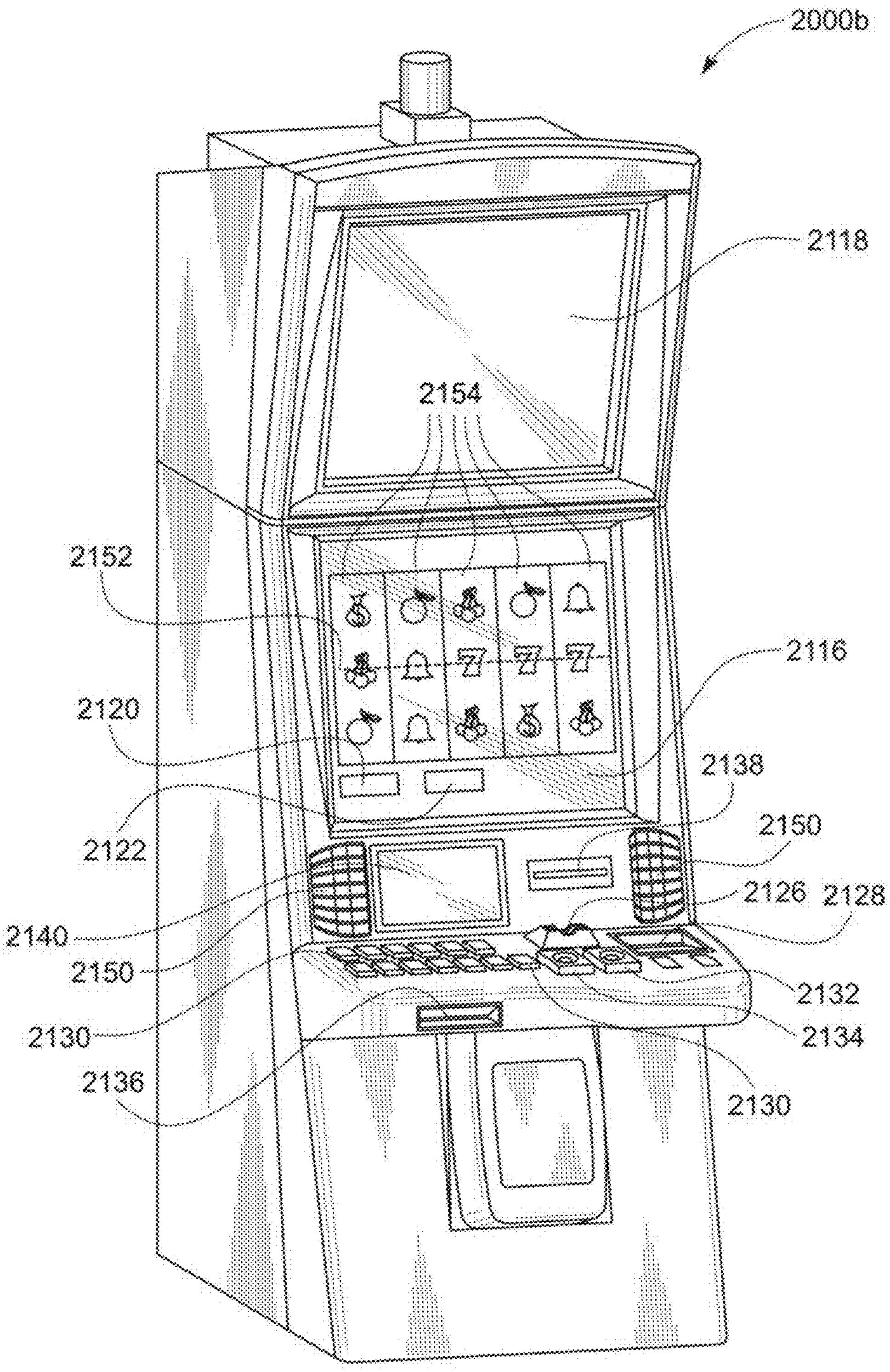
Figure 4C:
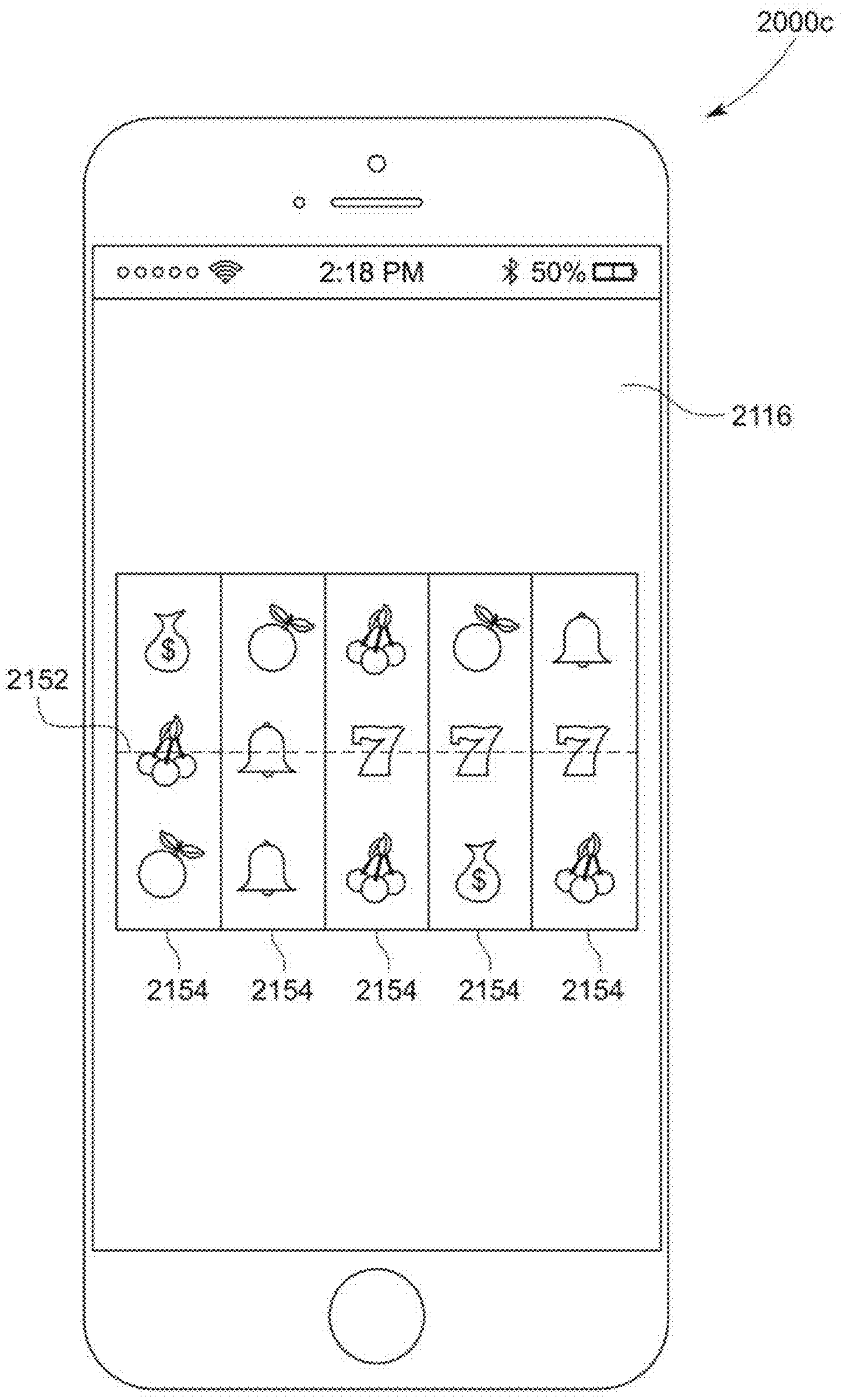
FIG. 4C is a front view of an example personal gaming device of the gaming system of the present disclosure.

FIG. 3 is a block diagram of an example EGM 1000 and FIGS. 4A and 4B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 4C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM of the present disclosure. In certain embodiments, the at least one memory device 1016 resides within the housing of the EGM (described below), while in other embodiments at least one component of the at least one memory device 1016 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM **2000*a* illustrated in FIG. 4A includes a central display device 2116, a player tracking display 2140, a credit display 2120, and a bet display 2122. The example EGM 2000*b* illustrated in FIG. 4B includes a central display device 2116, an upper display device 2118, a player tracking display 2140, a credit display 2120, and a bet display 2122**.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs **2000*a* and 2000*b* illustrated in FIGS. 4A and 4B each include a ticket printer and dispenser 2136**.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 4A and 4B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 4A and 4B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 4A and 4B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 4A and 4B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 4A and 4B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments including a player tracking system, as further described below, the at least one input device 1030 includes a card reader in communication with the at least one processor of the EGM. The example EGMs 2000*a* and 2000*b* illustrated in FIGS. 4A and 4B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, such as the example EGMs 2000*a* and 2000*b* illustrated in FIGS. 4A and 4B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 4A and 4B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a server and a changeable EGM, the at least one memory device of the server stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the server is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the server to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards.

In certain embodiments in which the gaming system includes a server and an EGM, the EGM is configured to communicate with the server for monitoring purposes only. In such embodiments, the EGM determines the game outcome(s) and/or award(s) to be provided in any of the manners described above, and the server monitors the activities and events occurring on the EGM. In one such embodiment, the gaming system includes a real-time or online accounting and gaming information system configured to communicate with the server. In this embodiment, the accounting and gaming information system includes: (a) a player database configured to store player profiles, (b) a player tracking module configured to track players (as described below), and (c) a credit system configured to provide automated transactions.

As noted above, in various embodiments, the gaming system includes one or more executable game programs executable by at least one processor of the gaming system to provide one or more primary games and one or more secondary games. The primary game(s) and the secondary game(s) can include any suitable games and/or wagering games, such as, but not limited to electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM 2000*b* shown in FIG. 4B includes a payline 2152 and a plurality of reels 2154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game (s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a “BONUS” symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, which is obtained, a given number of secondary game wagering points or credits is accumulated in a “secondary game meter” configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments' entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game, or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination, providing an input to a biometric sensor (e.g., a fingerprint sensor, a retinal sensor, a voice sensor, or a facial-recognition sensor), or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area.

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness, and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored, or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication-EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume, and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should be appreciated that the terminology used herein is for the purpose of describing particular aspects only and is not intended to be limiting of the disclosure. For example, the singular forms "a," "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention claimed is:

1. A gaming system comprising:

a housing comprising an access door;

a security monitoring circuit supported by the housing, that monitors the access door, and that causes a signal to be sent to a remote server when the access door is opened;

a plurality of output devices comprising: a display device supported by the housing, a player tracking display supported by the housing, a ticket printer supported by the housing, and a speaker supported by the housing;

a sound card supported by the housing and operable with the speaker;

a plurality of input devices comprising: a touch screen input device supported by the housing and operable with the display device, an acceptor supported by the housing, a validator supported by the housing, a player tracking card reader supported by the housing, and a cash-out button supported by the housing;

a processor supported by the housing; and a trusted memory device supported by the housing and configured to provide a gaming regulatory authority a root trusted authority that can be tracked and verified as original, the trusted memory device storing a plurality of instructions that, when executed by the processor, cause the processor to cause a display, via the display device, of a credit balance after the acceptor receives a physical currency or a physical ticket, after the validator validates the physical currency or the physical ticket, and after the player tracking card reader reads a player identification from a player tracking device, wherein the plurality of instructions, when executed by the processor, cause the processor to:

cause a display, by a display device, of part of a first reel and part of a second reel, said reels rotatable along a horizontal axis, cause a display, by the display device, of sheet music and components of the sheet music in a 90 degree vertically rotated position such that first components of the sheet music correspond to the first reel and second components of the sheet music correspond to the second reel, determine a mapping of the first components of the sheet music associated with the first reel with first reel symbols displayable on the first reel, determine a mapping of the second components of the sheet music associated with the second reel with second reel symbols displayable on the second reel, and cause a display, by the display device, of the first reels symbols on the first reel based on the first components of the sheet music and cause a display, by the display device, of the second reel symbols on the second reel based on the second components of the sheet music.

2. The gaming system of claim 1, wherein the first reel symbols are the same as the first components of the sheet music.

3. The gaming system of claim 1, wherein the first reel symbols are different than the first components.

4. The gaming system of claim 1, wherein the first and second components of the sheet music are notes.

5. The gaming system of claim 1, wherein each of the first and second reel symbols corresponds to a different one of the components of the sheet music, and wherein the plurality of first and second reel symbols are different than the components.

6. The gaming system of claim 1, wherein the plurality of instructions, when executed by the processor, cause the processor to cause a display, by the display device, of an additional component of the sheet music and an indication of the additional component resulting in a secondary outcome.

7. A gaming system comprising:

a housing comprising an access door;

a security monitoring circuit supported by the housing, that monitors the access door, and that causes a signal to be sent to a remote server when the access door is opened;

a plurality of output devices comprising: a display device supported by the housing, a player tracking display supported by the housing, a ticket printer supported by the housing, and a speaker supported by the housing;

a sound card supported by the housing and operable with the speaker;

a plurality of input devices comprising: a touch screen input device supported by the housing and operable with the display device, an acceptor supported by the housing, a validator supported by the housing, a player tracking card reader supported by the housing, and a cash-out button supported by the housing;

a processor supported by the housing; and a trusted memory device supported by the housing and configured to provide a gaming regulatory authority a root trusted authority that can be tracked and verified as original, the trusted memory device storing a plurality of instructions that, when executed by the processor, cause the processor to cause a display, via the display device, of a credit balance after the acceptor receives a physical currency or a physical ticket, after the validator validates the physical currency or the physical ticket, and after the player tracking card reader reads a player identification from a player tracking device, wherein the plurality of instructions, when executed by the processor, cause the processor to:

cause a display, by a display device, of sheet music and vocal components of the sheet music, wherein the vocal components comprise notes and chords, cause a display, by the display device, of an indication of a mapping of each of the vocal components of the sheet music onto-a reels, wherein each of the notes of the sheet music is mapped to a different symbol on the reels, and each of the chords of the sheet music is mapped to a same symbol on the reels, and cause a display, by the display device, of an indication of an outcome based on the mapping of the vocal components of the sheet music onto the reels.

8. The gaming system of claim 7, wherein the plurality of instructions, when executed by the processor, cause the processor to cause a display, by the display device, of reel symbols on the reels, wherein the reel symbols correspond to the vocal components of the sheet music, and wherein the reel symbols are different than the vocal components.

9. The gaming system of claim 7, wherein the plurality of instructions, when executed by the processor, cause the processor to cause a display, by the display device, of an additional component of the sheet music and an indication of the additional component resulting in a secondary outcome.

10. The gaming system of claim 7, wherein the plurality of instructions, when executed by the processor, cause the processor to cause a display, by the display device, of an indicator moving and stopping relative to the sheet music to indicate the vocal components of the sheet music.

11. The gaming system of claim 7, wherein the plurality of instructions, when executed by the processor, cause the processor to cause a display, by the display device, of the sheet music moving and stopping to indicate the vocal components of the sheet music.

12. A gaming system comprising:

a housing comprising an access door;

a security monitoring circuit supported by the housing, that monitors the access door, and that causes a signal to be sent to a remote server when the access door is opened;

a plurality of output devices comprising: a display device supported by the housing, a player tracking display supported by the housing, a ticket printer supported by the housing, and a speaker supported by the housing;

a sound card supported by the housing and operable with the speaker;

a plurality of input devices comprising: a touch screen input device supported by the housing and operable with the display device, an acceptor supported by the housing, a validator supported by the housing, a player tracking card reader supported by the housing, and a cash-out button supported by the housing;

a processor supported by the housing; and a trusted memory device supported by the housing and configured to provide a gaming regulatory authority a root trusted authority that can be tracked and verified as original, the trusted memory device storing a plurality of instructions that, when executed by the processor, cause the processor to cause a display, via the display device, of a credit balance after the acceptor receives a physical currency or a physical ticket, after the validator validates the physical currency or the physical ticket, and after the player tracking card reader reads a player identification from a player tracking device, wherein the plurality of instructions, when executed by the processor, cause the processor to:

cause a display, by a display device, of part of a first reel and part of a second reel, said reels rotatable along a vertical axis, cause a display, by the display device, of sheet music and components of the sheet music horizontally adjacent to the reels such that first components of a first slice of the sheet music correspond to the first reel and second components of a different second slice of the sheet music correspond to the second reel, determine a mapping of the first components of the first slice of the sheet music associated with the first reel with first reel symbols displayable on the first reel, determine a mapping of the second components of the second slice of the sheet music associated with the second reel with second reel symbols displayable on the second reel, and cause a display, by the display device, of the first reels symbols on the first reel based on the first components of the first slice of the sheet music and cause a display, by the display device, of the second reel symbols on the second reel based on the second components of the second slice of the sheet music.

13. The gaming system of claim 12, wherein the reel symbols are different than each of the first and second components.

14. The gaming system of claim 12, wherein the first and second components of the first and second slices of the sheet music are a plurality of different notes of the sheet music.

15. The gaming system of claim 12, wherein the first components of the first slice of the sheet music are combined into one of a chord and a diad for the mapping to the first reel.

* * * * *